United States Patent
Bates et al.

(10) Patent No.: US 10,097,879 B1
(45) Date of Patent: Oct. 9, 2018

(54) SYSTEMS AND METHODS FOR EXTENDING STORAGE SPACE OF A USER DEVICE

(71) Applicant: ROVI Guides, Inc., San Jose, CA (US)

(72) Inventors: Adam Bates, Los Gatos, CA (US); Jesse F. Patterson, Pacifica, CA (US); Mark K. Berner, Santa Clara, CA (US); Eric Dorsey, Palo Alto, CA (US); Jonathan A. Logan, Mountain View, CA (US); David W. Chamberlin, Pacifica, CA (US); Paul Stevens, Felton, CA (US); Herbert A. Waterman, Merced, CA (US)

(73) Assignee: ROVI GUIDES, INC., San Jose, CA (US)

( * ) Notice: Subject to any disclaimer, the term of this patent is extended or adjusted under 35 U.S.C. 154(b) by 0 days.

(21) Appl. No.: 15/858,612

(22) Filed: Dec. 29, 2017

(51) Int. Cl.
| | |
|---|---|
| H04N 5/00 | (2011.01) |
| H04N 19/00 | (2014.01) |
| H04N 21/00 | (2011.01) |
| H04N 21/433 | (2011.01) |
| H04N 21/4147 | (2011.01) |
| H04N 21/45 | (2011.01) |
| H04N 21/214 | (2011.01) |
| H04N 21/258 | (2011.01) |
| H04N 21/278 | (2011.01) |
| H04N 21/466 | (2011.01) |
| H04N 21/4627 | (2011.01) |
| H04N 21/25 | (2011.01) |

(Continued)

(52) U.S. Cl.
CPC ........... *H04N 21/433* (2013.01); *H04N 21/20* (2013.01); *H04N 21/21* (2013.01); *H04N 21/218* (2013.01); *H04N 21/2143* (2013.01); *H04N 21/2146* (2013.01); *H04N 21/2181* (2013.01); *H04N 21/21815* (2013.01); *H04N 21/2225* (2013.01); *H04N 21/24* (2013.01); *H04N 21/25* (2013.01); *H04N 21/251* (2013.01); *H04N 21/254* (2013.01); *H04N 21/258* (2013.01); *H04N 21/25808* (2013.01); *H04N 21/25833* (2013.01); *H04N 21/25841* (2013.01); *H04N 21/25875* (2013.01); *H04N 21/25883* (2013.01); *H04N 21/278* (2013.01); *H04N 21/4147* (2013.01); *H04N 21/4532* (2013.01); *H04N 21/4627* (2013.01); *H04N 21/4668* (2013.01)

(58) Field of Classification Search
None
See application file for complete search history.

(56) References Cited

U.S. PATENT DOCUMENTS

| | | | |
|---|---|---|---|
| 6,239,794 B1 | 5/2001 | Yuen | |
| 6,564,378 B1 | 5/2003 | Satterfield | |

(Continued)

*Primary Examiner* — Justin Shepard
(74) *Attorney, Agent, or Firm* — Haley Guiliano LLP

(57) ABSTRACT

Systems and methods are disclosed herein for extending the hardware of a digital video recorder (DVR) that records and stores media assets for a user to watch at a later time. For example, a media guidance application may predict a future physical location at which a user is scheduled to be located for a duration of time. The media guidance application may then cause the future location to form a local cloud storage for the user during the time when the user is located at the future location. The local cloud may be used to store one or more media assets transferred from the user's DVR to the established local cloud using the local storage hardware at the future location.

20 Claims, 11 Drawing Sheets

(51) Int. Cl.
*H04N 21/24* (2011.01)
*H04N 21/218* (2011.01)
*H04N 21/2225* (2011.01)
*H04N 21/254* (2011.01)
*H04N 21/20* (2011.01)
*H04N 21/21* (2011.01)

(56) References Cited

U.S. PATENT DOCUMENTS

| | | |
|---|---|---|
| 7,165,098 B1 | 1/2007 | Boyer |
| 7,761,892 B2 | 7/2010 | Ellis |
| 8,046,801 B2 | 10/2011 | Ellis |
| 2002/0174430 A1 | 11/2002 | Ellis |
| 2005/0251827 A1 | 11/2005 | Ellis |
| 2010/0153885 A1 | 6/2010 | Yates |

SYSTEMS AND METHODS FOR EXTENDING STORAGE SPACE OF A USER DEVICE

BACKGROUND

Existing media systems provide a digital video recorder (DVR) for a user to record media assets at the DVR and playback the recorded media assets at a later time. However, the storage space of a local DVR is usually limited. Some existing systems provide a network storage space for the user to store media assets at a cloud DVR or storage device, and the user can often access the stored media assets by visiting the cloud DVR via a communication network. For example, some existing systems provide a web portal or a mobile application such that a user can access previously stored media assets from the DVR via the communications network when the user is at different locations. However, when the user is located at a place with limited network access, e.g., no broadband network access, the user is unable to stream or download the previously stored media assets from his or her DVR.

SUMMARY

Accordingly, systems and methods are disclosed herein for extending the content of a digital video recorder (DVR) to a storage device at another location where the user will be in the future. For example, a media guidance application may predict a future physical location at which a user is scheduled to be located for a duration of time. The media guidance application may then cause the future location to form a local cloud storage for the user during the time when the user is located at the future location. The local cloud may be used to store one or more media assets transferred from the user's DVR to the established local cloud using the local storage hardware at the future location. In this way, even if the user may have no or limited network access to the user's DVR when the user is located at the future location, the user may watch the transferred media assets that have been stored at the local storage hardware at the future location.

The media guidance application may obtain user behavioral data aggregated from one or more user devices associated with a user. For example, the media guidance application may obtain and aggregate data relating to the user's travel schedule from various data sources such as but not limited to emails, social media activities, text messages, instant messages, calendar events, and/or the like. Based on the aggregated user data, the media guidance application may identify a time schedule and a physical location where the user is scheduled to be located for a duration of time. For example, the media guidance application may obtain flight information from a reservation email and may identify a storage device on a plane the user will board to reach the given destination.

The media guidance application may then transmit, to the remote server, a query including identifying information for the physical location, for information relating to a storage device associated with the physical location. For example, the media guidance application may obtain a calendar event indication from the user behavioral data, and parse the calendar event indication to obtain an identifier for the physical location, a start time of the duration of time, and an end time of the duration time. The media guidance application may then determine whether the physical location relates to a private entity (e.g., the residence of a private contact) or a public entity (e.g., a public transportation vehicle) based on the identifier for the physical location.

In some embodiments, the media guidance application may, in response to determining that the physical location relates to a public entity, transmit, to the remote server, the query based on the identifier for the public entity. The media guidance application may then obtain, from the remote server, a first physical network address (e.g., an IP address) for data transfer, corresponding to a location where the storage device associated with the public entity will be located, e.g., an airport where an airplane will be located or the on-board server of the airplane.

In some embodiments, in response to determining that the physical location relates to a private entity, the media guidance application may form a query on a local database of contacts based on the identifier for the private entity. In response to the query, the media guidance application may obtain contact information relating to the private entity, including, but not limited to a telephone number, a user name, a residential address, an electronic mail address, an instant messenger screen name, and a social media profile name, and/or the like. The media guidance application may transmit, to the remote server, the query including the identifier and the contact information (e.g., telephone number, email address, residential address, etc.) relating to the private entity to search for storage availability at the private entity. The media guidance application may then obtain, from the remote server, a second physical network address (e.g., an IP address of a home DVR associated with the private entity) for data transfer to the storage device associated with the private entity.

The media guidance application may determine one or more media assets that are available to be transferred to the storage device associated with the physical location. For example, the media guidance application may identify available media assets based on the travel schedule. Specifically, the media guidance application may identify a first set of previously stored media assets at the DVR corresponding to the user. The media guidance application may also retrieve a scheduled recording list of media assets from the DVR, and identify a second set of media assets from the scheduled recording list that has a scheduled transmission time earlier than the start time of the duration of time when the user will be located at the physical location. The media guidance application may then aggregate the first set of previously stored media assets and the second set of media assets as a list of candidate media assets to be transferred to the storage device associated with the physical location.

In some embodiments, in response to transmitting to the remote server the query including identifying information for the physical location, the media guidance application may receive, from the remote server, a permission list of media sources corresponding to the physical location. The permission list specifies that media assets originally transmitted from the permission list of media sources are eligible to be transferred to the physical location. For example, the media guidance application may not be able to cause the transfer of a particular media asset to a physical location, when the physical location does not have permission to access content of the particular media source.

In some embodiments, the media guidance application may determine a set of media assets that will be available at the DVR for transfer, prior to the start time of the duration of time when the user will be located with the physical location, and then generate a first subset of media assets from the set of media assets subject to the permission list of media sources. Each media asset from the subset corresponds to a media source on the permission list. The media guidance application may then generate for display, a list of selectable options representing the second subset of media assets to prompt the user to select the one or more media assets to be transferred to the storage device associated with the physical location.

In some embodiments, for each media asset from the first subset of media assets, the media guidance application may determine a respective program length corresponding to a portion of the respective media asset that the user has not viewed. The media guidance application may then generate a second subset of media assets from the first subset of media assets subject. Each media asset from the second subset has the respective program length to be shorter than the duration of time during which the user is located with the physical location.

In some embodiments, for each media asset from the first subset of media assets, the media guidance application may determine a respective user interest indicator. The user interest indicator may be a numeric value assigned to each media asset, reflecting a user interest level in the respective media asset. The media guidance application may then rank the first subset of media assets based on the respective user interest indicator, and then generate for display, a recommendation of, or automatically selecting a media asset with a highest user interest indicator from the ranking as a candidate for transferring to the storage device associated with the physical location.

The media guidance application may establish access rights rules for the one or more media assets to restrict access to the one or more media assets at the physical location based on the duration of time and a user authentication requirement. To accomplish this, in some embodiments, the media guidance application may prompt, via a user interface, the user to establish security identifying information associated with the one or more media assets, e.g., a passcode, a voice signature for voice recognition, a fingerprint, a retina scan, an iris scan, a facial scan, a security question and answer, and/or the like. The media guidance application may generate a security file including the security identifying information and an auto-deletion command subject to the duration of time. For example, the auto-deletion command may instruct the storage device at the physical location to erase the media asset from the storage device at the physical location once the timer reaches the time limit. Prior to causing the transfer of the copy of the one or more media assets, the media guidance application may encrypt the copy of the one or more media assets with the security file.

The media guidance application may send, to the remote server, a transfer request including an indication of the duration of time when a copy of the one or more media assets is scheduled to be made available at the physical location and the determined access rights rules. In some embodiments, in response to determining the one or more media assets to be transferred to the storage device associated with the physical location, the media guidance application may send, to the remote server, indications of the one or more media assets. The media guidance application may receive a response from the remote server indicating whether the one or more media assets will be available at the physical location at the time corresponding to the duration of time when the user is located at the physical location. In response to determining that the determined one or more media assets to be transferred will be available at the physical location without the transferring from the user's DVR (e.g., from a different source), the media guidance application may refrain from causing the transfer of the copy of the one or more media assets to the storage device associated with the physical location.

The media guidance application may cause a transfer of the copy of the one or more media assets to the storage device associated with the physical location. For example, the media guidance application may determine when to transfer the copy of the one or more media assets to the physical location. In response to determining that the physical location corresponds to a transportation vehicle, the media guidance application may obtain a travel schedule corresponding to the transportation vehicle based on the identifying information relating to the physical location. The media guidance application may then determine, from the travel schedule, a first time when the transportation vehicle is physically located at a first location with broadband network access and a second time when the transportation vehicle is physically located at the second location with broadband network access. The media guidance application may then determine that the first location corresponds to a closer network destination from the DVR than the second location, and thus cause the transfer of the copy of the one or more media assets to the storage device associated with the physical location via the broadband network access when the transportation vehicle is physically located at the first location.

In some embodiments, the media guidance application may determine whether there is enough space at the physical location to transfer the encrypted copy of one or more media asset. The media guidance application may send, to the remote server, the transfer request having an estimate of storage space for the one or more media assets. The media guidance application may receive an indication that the storage device associated with the physical location has insufficient storage space. The media guidance application may then convert the copy of one or more media assets from a first video format to a second video format with a reduced file size, and then cause the transfer of the converted copy of one or more media assets in the second video format to the storage device associated with the physical location.

The media guidance application may cause presentation, at the physical location, of the copy of the one or more media assets within the duration of time based on the user authentication requirement.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
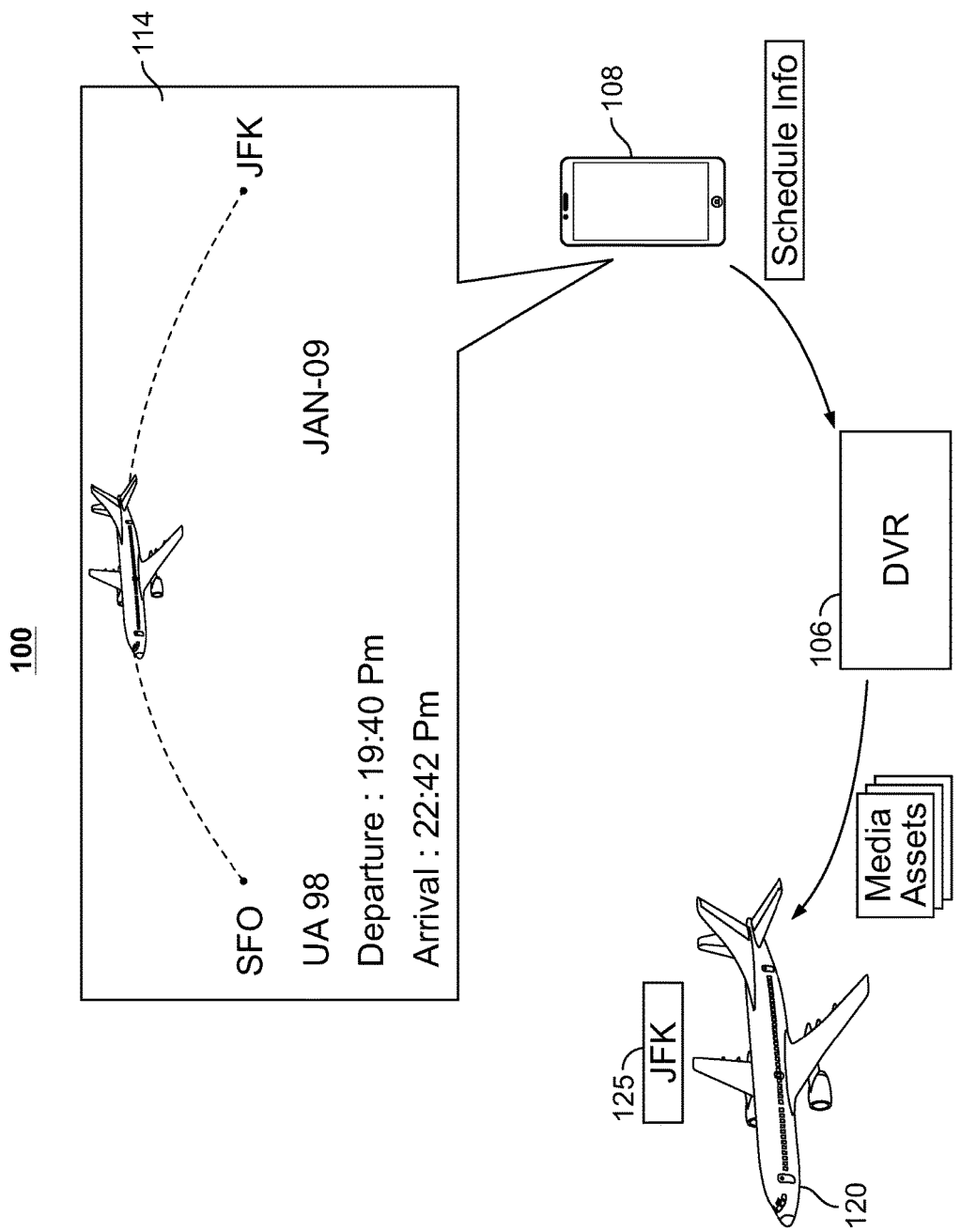
FIG. 1 depicts an illustrative example diagram for extending the storage hardware of a DVR to the storage hardware associated with a physical location, in accordance with some embodiments of the disclosure.

Accordingly, systems and methods are disclosed herein for extending the content of a digital video recorder (DVR) to a storage device at another location where the user will be in the future. Specifically, a media guidance application, implemented at user equipment, may be used to predict a user's location at a future time, and to obtain storage hardware information of the future location of the user. The media guidance application may then cause the future location to form a local cloud storage for the user during the time when the user is located at the future location. The local cloud may be generated using the local storage hardware at the future location. The media guidance application may then cause the transfer of one or more media assets from the user's DVR to the established local cloud using the local storage hardware at the future location.

For example, a user may travel from New York to San Francisco for six hours by air. During the flight, the user has no or limited in-flight Internet access and will not be able to download or stream his or her previously stored media assets from his or her DVR due to limited network connection. Before the travel date, the media guidance application may identify the user's travel schedule, and send a query to a remote server for a request to establish a local cloud for the user on the airplane where the user is going to travel with. The media guidance application may cause the transfer of one or more media assets from a local or a DVR to the storage hardware installed on the airplane when the airplane is parked at an airport with broadband access. In this way, when the user boards the airplane as scheduled, the user may be able to access and watch the media assets that have been transferred to the local storage on the airplane during the flight.

For another example, a user may schedule to stay at his or her grandparents' house, where there is no Wi-Fi. Instead of using 4G network to stream previously stored media assets from the user's DVR on the user's mobile phone, the media guidance application may identify the user's travel schedule, and retrieve the grandparents' address to determine whether the grandparents' house is associated with a DVR. If a DVR is identified at the grandparents' house, the media guidance application may automatically cause the transfer of one or more media assets from the user's DVR to the DVR at the grandparents' house via a broadband network. In this way, the user may be able to access and watch the media assets that have been transferred to the local DVR at the grandparents' house when the user is physically located at the grandparents' place.

As referred to herein, the term "physical location" refers to any physical place where a user can stay at, within or associated with. For example, a physical location may include, but not limited to a transportation vehicle, a building, a mobile home, a booth, a parking lot, a train or bus stop, an airport, and/or the like. As referred to herein, the term "public entity" refers to any entity that is accessible by the general public upon an appropriate license. For example, a public entity may include, but not limited to a library, a museum, a restaurant, a café, an airline, a train, a bus, a taxi, a cruise ship, and/or the like. As referred to herein, the term "private entity" refers to any entity residing in a private residence. For example, a private entity may include, but not limited to a private individual, a private business or workplace, and/or the like. As referred to herein, the term "digital video recorder (DVR)" refers to any video storage device that the media guidance application is configured to access and/or store one or more media assets thereon. For example, a DVR includes, but not limited to a local (home) storage device that is disposed with a set-top box housed within a residence, a network storage device that is accessible by the media guidance application running on the set-top box via a communications network, a cloud storage device that is disposed in a cloud that is accessible by the media guidance application via the communications network, and/or other types of DVRs.

As referred to herein, the term "causing" refers to performing an action that directly or indirectly make something happen. For example, the media guidance application, which is implemented at a set-top box located at a residential home, when sending a request to a remote server to transfer a media asset from a DVR to a local storage device located on an airplane, causes the transferred media asset to be accessed and played at a media device on the airplane.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in VOD systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer-readable media. Computer-readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

It is to be noted that embodiments described herein may be implemented by a media guidance application implemented on a set-top box, or any other application that receives media guidance data and that can be configured to remotely communicate with a set-top box.

With the advent of the Internet, mobile computing, and high-speed wireless networks, users are accessing media on user equipment devices on which they traditionally did not use. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters" or providers" logos, etc.), media format (e.g., standard definition, high definition, 3D, etc.), on-demand information, blogs, websites, and any other type of guidance data that is helpful for a user to navigate among and locate desired content selections.

As referred to herein, the term "in response to" refers to initiated as a result of. For example, a first action being performed in response to a second action may include interstitial steps between the first action and the second action. As referred to herein, the term "directly in response to" refers to caused by. For example, a first action being performed directly in response to a second action may not include interstitial steps between the first action and the second action.

FIG. 1 depicts an illustrative example diagram 100 for extending the storage hardware of a DVR to the storage hardware associated with a physical location, in accordance with some embodiments of the disclosure. Diagram 100 shows a user device 108, a DVR 106, and an airplane 120 parked at an airport 125 (e.g., John Kennedy Airport (JFK)), which may exchange data and interact with each other via a communication network (e.g., communications network 714 in relation to FIG. 7). For example, as shown in FIG. 1, the user device 108 may identify flight information 114 of a user and may send a transfer request including the flight schedule to the DVR 106 to cause the DVR 106 to transfer one or more media assets to a storage device on an airplane 120 corresponding to the flight number, when the airplane 120 is located at a local airport, e.g., the JFK airport 125. Further detail of the process shown in diagram 100 is described below.

The media guidance application may obtain travel information relating to a user. Specifically, the media guidance application may obtain user behavioral data aggregated from one or more user devices associated with a user. For example, the media guidance application may obtain and aggregate data relating to the user's travel schedule from various data sources such as but not limited to emails, social media activities (e.g., a user may join an event on social media, etc.), text messages, instant messages, calendar events, and/or the like. The media guidance application may aggregate such data across different devices associated with the same user account, such as a computer, a Smartphone, a tablet computer, and/or the like. In some embodiments, the media guidance application that is implemented at a set-top box (e.g., DVR 106) may obtain and aggregate user data from various devices. In some embodiments, an extended application of the media guidance application, such as a mobile app implemented at a user mobile device 108, may be used to aggregate user data from various devices.

Figure 3:
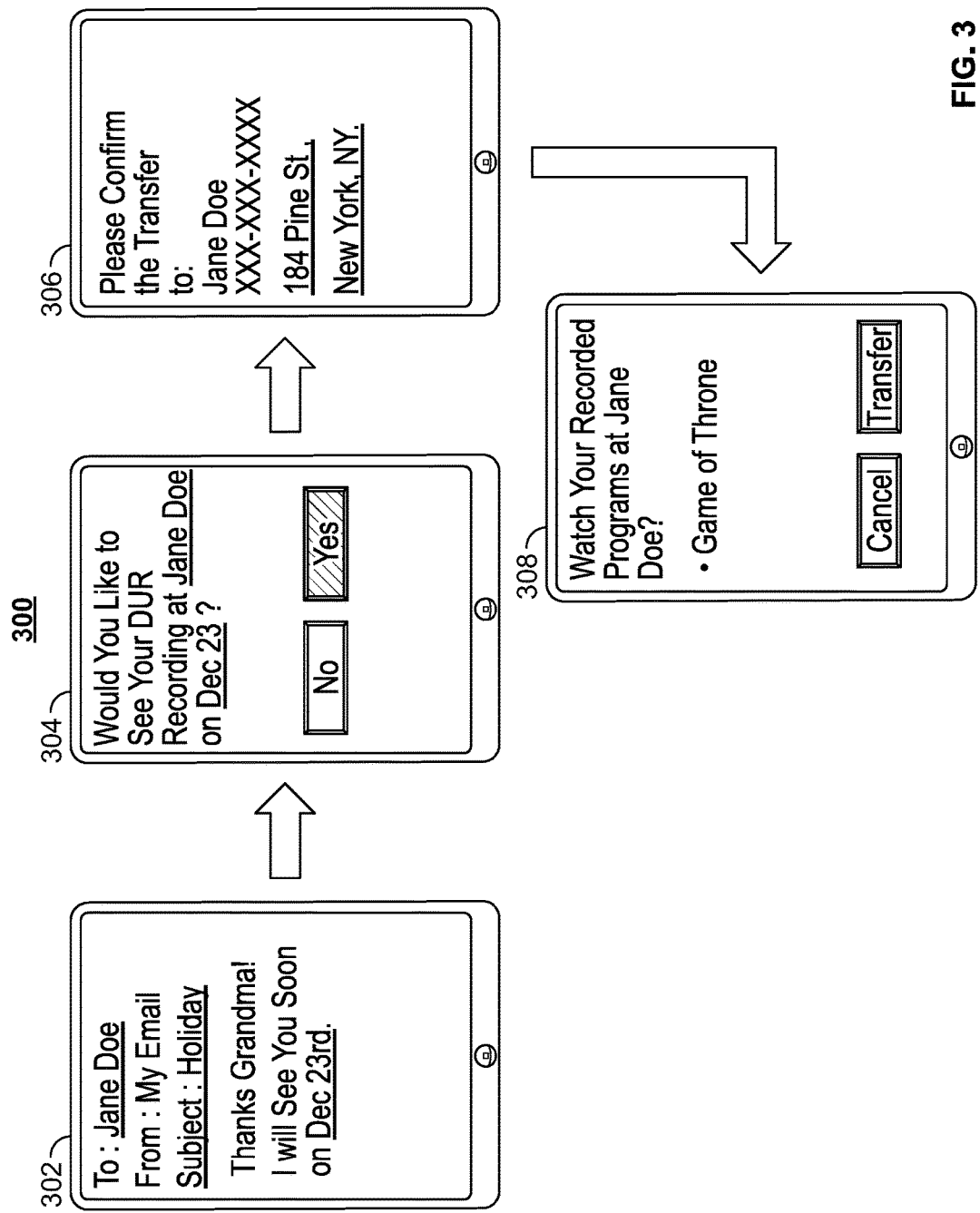
FIG. 3 depicts an illustrative example user interface (UI) diagram showing transferring a media asset to the residence of a private entity, in accordance with some embodiments of the disclosure.

The media guidance application may predict where the user is likely to be located at a future time. Specifically, the media guidance application may identify, from the user behavioral data, a time schedule and a physical location where the user is scheduled to be located for a duration of time. For example, the media guidance application may obtain flight information 114, e.g., from a reservation email, a calendar event, and/or the like. For another example, FIG. 3 provides a diagram 300 showing example mobile UIs (e.g., at user device 108) for transferring media assets from a user's DVR to storage space the user's grandmother's residence. As shown at 302 in FIG. 3, the media guidance application may obtain the user's travel plan to visit the user's grandmother at the date of "December $23^{rd}$." At 304 in FIG. 3, the media guidance application may optionally prompt the user to decide whether to transfer media assets to the future location at the residence of "Jane Doe" (grandmother) on the date of "December $23^{rd}$." In some embodiments, the media guidance application, if implemented as a mobile app on the user device 108, may optionally send the schedule information to the DVR 106.

The media guidance application may then coordinate with a remote server to transfer one or more media assets to the physical location such that the user may access the media assets at local storage of the physical location when the user is present at the physical location, without accessing a DVR or the remote server via broadband network access. For example, upon identifying that the user will be located at a physical location (e.g., a flight from JFK to SFO, or grandmother's house), the media guidance application may inquire the user whether to transfer available media assets to the future destination. Specifically, the media guidance application may transmit, to the remote server, a query including identifying information for the physical location, for information relating to a storage device associated with the physical location.

In some embodiments, the media guidance application may find the physical location based on different types of the physical location. Specifically, the media guidance application may obtain a calendar event indication from the user behavioral data, and parse the calendar event indication to obtain an identifier for the physical location, a start time of the duration of time, and an end time of the duration time. For example, the media guidance application may parse a date of "Jan-09," a physical location of "UA98," and a duration from "19:40 PM" Eastern Time to "22:42 PM" Pacific Time from the flight information 114. The media guidance application may then determine whether the physical location relates to a private entity or a public entity based on the identifier for the physical location. In the respective example, the media guidance application may determine, based on the identifier of "UA98" which is a flight number, that the physical location where the user is going to be located is a public transportation vehicle.

In some embodiments, the media guidance application may, in response to determining that the physical location relates to a public entity, transmit, to the remote server, the query based on the identifier for the public entity. For example, the media guidance application may include identifying information of the flight number "UA98" and the flight date of "Jan-09" to the remote server. The remote server may query a database of airlines based on the identifying information, and retrieve a network address (e.g., an IP address) corresponding to airplane with the flight number "UA98." The media guidance application may then obtain, from the remote server, a first physical network address for data transfer, corresponding to a location where the storage device associated with the public entity will be located. For example, the remote server may forward the query including the flight number "UA98" and the flight date of "Jan-09" to a database or a server located by the local airport or the airline company, and receive the query result of a network address of the airplane corresponding to the flight, and a schedule of the airplane indicating when the airplane is located at the airport.

In some embodiments, in response to determining that the physical location relates to a private entity, the media guidance application may form a query on a local database of contacts based on the identifier for the private entity. For example, referring to diagram 300 in FIG. 3, the media guidance application may determine that the user's future location at the residence of "Jane Doe" (grandmother) is a private entity. At 306, the media guidance application may search for the contact "Jane Doe" in the user's contact list, and present the contact information of "Jane Doe" for the user to confirm. Specifically, in response to the query, the media guidance application obtains contact information relating to the private entity, including, but not limited to a telephone number, a user name, a residential address, an electronic mail address, an instant messenger screen name, and a social media profile name, and/or the like. The media guidance application may transmit, to the remote server, the query including the identifier (e.g., "Jane Doe") and the contact information (e.g., telephone number, email address, residential address, etc.) relating to the private entity to query for storage availability at the private entity. For example, the remote server may in turn retrieve a profile stored at the server relating to the private entity "Jane Doe," and decide whether the private entity has a DVR associated therewith. The media guidance application may then obtain, from the remote server, a second physical network address for data transfer to the storage device associated with the private entity. For example, the second physical network address may include an IP address, a medium access control (MAC) address, and/or the like of the DVR associated with the private entity "Jane Doe," which can be used to receive data transfer on a data network (e.g., communications network 714 in FIG. 7).

Figure 2:
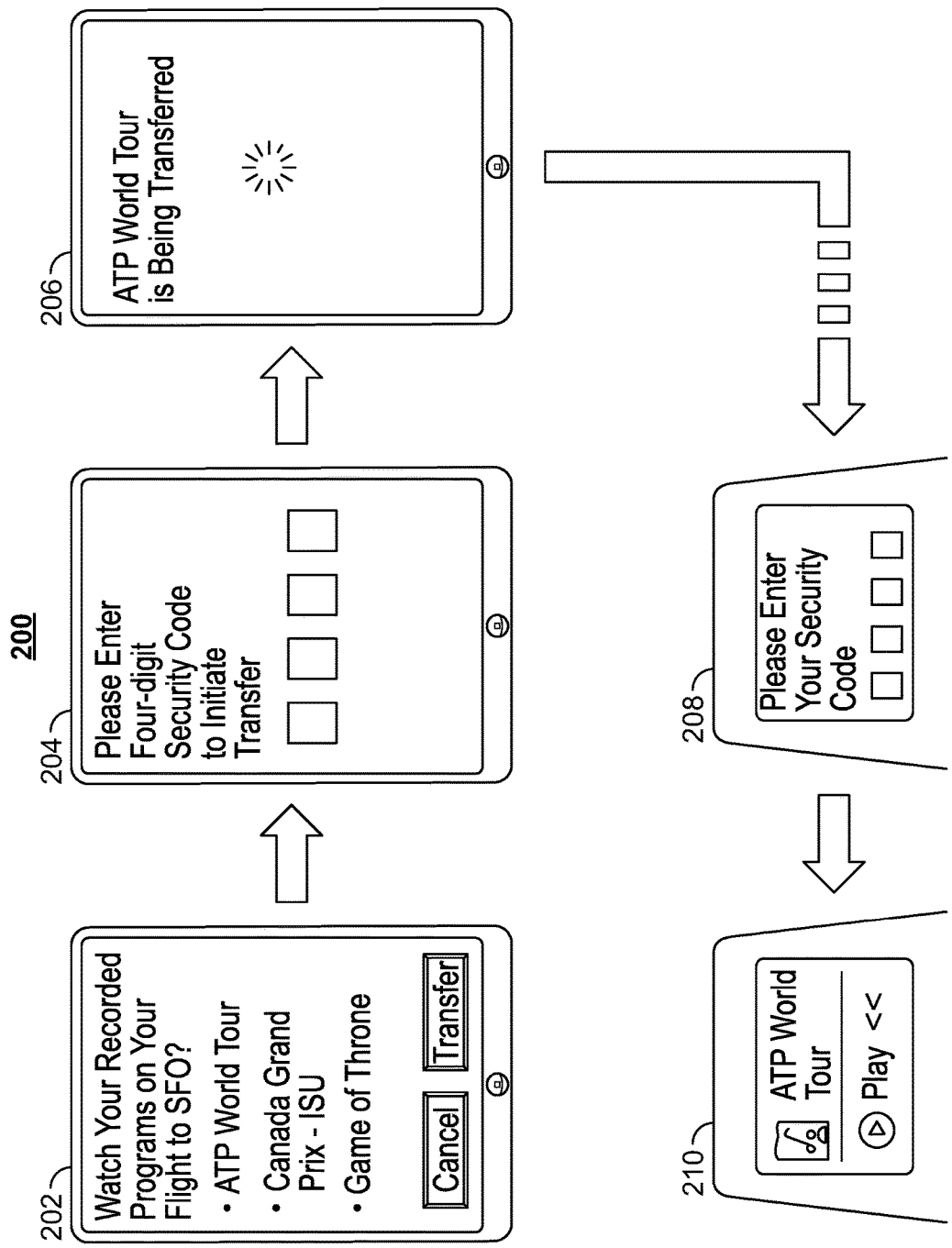
FIG. 2 depicts an illustrative example user interface (UI) diagram showing an authentication procedure for the user to transfer a media asset and access the media asset at a later time, in accordance with some embodiments of the disclosure.

Referring to FIG. 1, in response to determining that the storage device associated with the physical location is available for transferring one or more media assets, the media guidance application may determine what to transfer from the DVR 106 to the physical location 120. Specifically, the media guidance application may determine one or more media assets that are available to be transferred to the storage device associated with the physical location. In some embodiments, the media guidance application may automatically determine and send media assets for transferring. In some embodiments, the media guidance application may determine a list of candidate media assets for transfer and prompt the user to select via a user interface. For example, FIG. 2 shows example UIs illustrating a user transferring media assets from a DVR to the storage space of an airplane. As shown at 202, the media guidance application may prompt the user to select one or more media assets from the list for the flight to SFO. Similarly, as shown at screen 308 in FIG. 3, the media guidance application may prompt the user to select one or more media assets for the user's visit at the residence of "Jane Doe" (grandmother).

In some embodiments, the media guidance application may identify available media assets based on the travel schedule. Specifically, the media guidance application may identify a first set of previously stored media assets at the DVR 106. For example, at the time when the media guidance application identifies the travel schedule of the user (e.g., when the screen 202 in FIG. 2 is presented), or when the user confirms that he or she would like to transfer media assets to the future physical location (e.g., when the user taps "Yes" at screen 304 to indicate an interest to transfer media assets in FIG. 3), the media guidance application may retrieve the previously stored media assets in the DVR 106. The media guidance application may also retrieve a scheduled recording list of media assets from the DVR 106, and identify a second set of media assets from the scheduled recording list that has a scheduled transmission time earlier than the start time of the duration of time when the user will be located at the physical location. For example, as the travel information 114 indicates the user will be on the flight at 19:40 PM on Jan 9, the media guidance application may identify a list of media assets that haven't been recorded yet but will be recorded and made available before the departure time of the flight. The media guidance application may then aggregate the first set of previously stored media assets and the second set of media assets as a list of candidate media assets to be transferred to the storage device associated with the physical location. For example, as shown at screen 202 in FIG. 2, or screen 308 in FIG. 3, the media guidance application may generate for display, a list of candidate media assets to the user.

In some embodiments, the media guidance application may limit the list of candidate media assets based on license permission. Specifically, in response to transmitting, to the remote server, the query including identifying information for the physical location, the media guidance application may receive, from the remote server, a permission list of media sources corresponding to the physical location. The permission list specifies that media assets originally transmitted from the permission list of media sources are eligible to be transferred to the physical location. For example, a media asset recorded or scheduled to be recorded from a media source by the user at the user's DVR 106 may be made available to the user for playback at user equipment associated with the DVR 106, because the user has subscribed to and thus been authorized to access media content from the media source. Different media sources may have different restriction and/or permission requirement for the user to transfer a previously stored media asset from a respective media source to watch at a different location. For example, some channels may require that media assets recorded from the channel can only be shared with a physical location that has subscribed to the respective channel. Thus, the media guidance application may not be able to cause the transfer of a particular media asset to a physical location, when the physical location does not have permission to access content of the particular media source.

In some embodiments, the media guidance application may determine a set of media assets that will be available, at the DVR 106, prior to the start time of the duration of time when the user will be located with the physical location, and then generate a first subset of media assets from the set of media assets subject to the permission list of media sources. Each media asset from the subset corresponds to a media source on the permission list. The media guidance application may then generate for display, a list of selectable options representing the second subset of media assets to prompt the user to select the one or more media assets to be transferred to the storage device associated with the physical location. For example, as shown at screen 202 in FIG. 2, the media guidance application may display candidate media assets for transferring including "ATP World Tour" recorded from EPSN channel, "Canada Grand Prix" recorded from Olympics channel, and "Game of Thrones" recorded from HBO channel, upon determining that the airline carrier has subscription to all the above channels. For another example, as shown at screen 308 in FIG. 3, the media guidance application may only display candidate media asset "Game of Thrones," upon determining that the private entity "Jane Doe" has permission to access HBO channel but does not have permission to access to ESPN channel or Olympics channel.

In some embodiments, the media guidance application may further limit the list of candidate media assets for transferring based on a length of the media asset. Specifically, for each media asset from the first subset of media assets, the media guidance application may determine a respective program length corresponding to a portion of the respective media asset that the user has not viewed. For example, for the media asset "ATP World Tour" shown at 202 in FIG. 2, the media guidance application may retrieve a playback position from the metadata of the media asset, indicating the progression point where the user left off the media asset, e.g., at 35'30" of the entire program of 90 minutes. Thus, the media guidance application may determine a remaining length of 54'30" for the media asset "ATP World Tour." The media guidance application may then generate a second subset of media assets from the first subset of media assets subject. Each media asset from the second subset has the respective program length to be shorter than the duration of time during which the user is located with the physical location. In some embodiments, when the duration of time when the user is going to be located at the physical location is longer than any of the available media assets, e.g., when the user is going on a six-hour flight from JFK to SFO as shown at 114 in FIG. 1, the media guidance application may recommend a few media assets that have a total length shorter than the duration of time.

In some embodiments, the media guidance application may recommend or automatically select media assets from the DVR 106 as candidates for transfer based on user preference or viewing patterns. Specifically, for each media asset from the first subset of media assets, the media guidance application may determine a respective user interest indicator. The user interest indicator may be reflected based on at least one of a first viewing status indicating whether a user has started but not finished with the respective media asset, a second viewing status indicating whether a user has viewed at least another media asset that belong to a same series with the respective media asset, user preference data describing an attribute of media assets, or a recording status indicating whether the respective media asset was stored in response to a user manually configured recording event or an automatically generated recording series, and/or the like. For example, the media guidance application may determine how many of the above-mentioned indicators a respective media asset has a match, based on which the media guidance application may generate a numeric value as the respective user interest indicator for the respective media asset. The media guidance application may then rank the first subset of media assets based on the respective user interest indicator, and then generate for display, a recommendation of, or automatically selecting a media asset with a highest user interest indicator from the ranking as a candidate for transferring to the storage device associated with the physical location. For example, as shown at screen 202 in FIG. 2, the displayed list of "ATP World Tour," "Canada Grand Prix," and "Game of Thrones" may be the highest ranked media assets from the DVR 106 based on user interests. In some embodiments, the media guidance application may automatically determine the highest ranked media asset as the candidate for transfer without user input.

The media guidance application may establish access rights rules for the one or more media assets to restrict access to the one or more media assets at the physical location based on the duration of time and a user authentication requirement. For example, the media guidance application may only allow a user to access the transferred copy of the one or more media assets at the physical location (e.g., during the flight or at the grandmother's home) within the scheduled duration of the time. In addition, the media guidance application may require a user authentication procedure to authenticate the user at the physical location in order to permit access to the transferred media assets.

To accomplish this, in some embodiments, the media guidance application may prompt, via a user interface, the user to establish security identifying information associated with the one or more media assets. For example, as shown at screen 204 in FIG. 2, upon a user selecting the media asset "ATP World Tour" for transfer at screen 202, the media guidance application may prompt the user to enter a four-digit security code. In another example, the media guidance application may prompt the user to enter any form of security information, such as but not limited to a passcode, a voice signature for voice recognition, a fingerprint, a retina scan, an iris scan, a facial scan, a security question and answer, and/or the like. The media guidance application may generate a security file including the security identifying information and an auto-deletion command subject to the duration of time. For example, the media guidance application may attach an auto-deletion command that is configured with a timer and a time limit subject to the duration of the time. The auto-deletion command may instruct the storage device at the physical location to erase the media asset from the storage device at the physical location once the timer reaches the time limit. For example, the media asset "ATP World Tour" that has been transferred to the airplane may be automatically deleted at the end of the duration of the time, e.g., at the arrival time of the flight, "22:43 PM" as indicated in flight information 114 in FIG. 1. Prior to causing the transfer of the copy of the one or more media assets, the media guidance application may encrypt the copy of the one or more media assets with the security file. For example, as shown at screen 206 in FIG. 2, the encrypted copy of "ATP World Tour" may be transferred to the airplane. At the time when the user boards the flight, e.g., at 19:40 PM on Jan 9 according to the flight information 114 in FIG. 1, the user may access the transferred copy of "ATP World Tour," e.g., at the in-flight multimedia system. As shown at 208 in FIG. 2, the in-flight multimedia system may automatically identify the user based on the user's check-in information including seat arrangement, and then retrieve the encrypted copy of "ATP World Tour" to prompt the user to enter the security code, in order to unlock the security file that encrypts the media asset. At screen 210 in FIG. 2, upon the user input of the security code, the in-flight multimedia system may present the media asset "ATP World Tour" to the user for playback.

In some embodiments, the media guidance application may not require a user to manually establish a security code. For example, the media guidance application may include user profile credentials into the security file, and encrypt the one or more media asset with the security file. When a user obtains seat assignment for the flight corresponding to flight information 114 in FIG. 1, the airline may automatically associate the seat information with the user profile such that the transferred media asset will be unlocked and made available only at the in-flight multimedia system presented to the seat assigned to the user during the flight. For another example, the media guidance application, when implemented as a mobile app running on the user's mobile device 108 in FIG. 1, may determine that the user's geographical location is consistent with the intended destination (e.g., the residence of "Jane Doe") according to the travel schedule, e.g., via a GPS component installed at the user device 108. Upon determining the user is physically located at the physical location (e.g., the residence of "Jane Doe"), the media guidance application may automatically send a message, to a remote server, which may in turn send a message to authorize the DVR at the residence of "Jane Doe" to display the transferred media assets.

The media guidance application may send, to the remote server, a transfer request including an indication of the duration of time when a copy of the one or more media assets is scheduled to be made available at the physical location and the determined access rights rules. In some embodiments, the media guidance application may determine whether any media assets to be transferred is already or will be available at the physical location. Specifically, in response to determining the one or more media assets to be transferred to the storage device associated with the physical location, the media guidance application may send, to the remote server, indications of the one or more media assets. For example, at screen 202 in FIG. 2, the media guidance application may receive a user selection of the media asset "ATP World Tour" and send the indication of the media asset to a remote server. The media guidance application may receive a response from the remote server indicating whether the one or more media assets will be available at the physical location at a time corresponding to the duration of time when the user is located at the physical location. For example, the remote server may in turn send a query including information relating to the media asset "ATP World Tour" to the airline, which may return information indicating whether the "ATP World Tour" will be available at a VOD system on the airplane of the respective flight, e.g., "UA98." The media guidance application may refrain from causing the transfer of the copy of the one or more media assets to the storage device associated with the physical location, when the one or more media assets will be available at the physical location.

The media guidance application may then transfer the encrypted media assets from the DVR 106 to a physical location, e.g., the airplane 120 when the airplane 120 is located with the airport 125 in FIG. 1. Specifically, the media guidance application may, in response to the transfer request, cause a transfer of the copy of the one or more media assets to the storage device associated with the physical location. For example, as shown in screen 206 in FIG. 2, the media guidance application, when implemented as a mobile app running on the user device 108, may send a command to the DVR 106 to transfer the "ATP World Tour" to a network address corresponding to the storage device of the airplane 120.

In some embodiments, the media guidance application may determine when to transfer the copy of the one or more media assets to the physical location. For example, when the physical location is a public transportation vehicle such as an airplane, a train, etc., the transportation vehicle may not always have broadband access. The media guidance application may transfer the copy of media assets to the airplane 120 when the airplane 120 is located within the airport 125 with broadband access. Specifically, in response to determining that the physical location corresponds to a transportation vehicle, the media guidance application may obtain a travel schedule corresponding to the transportation vehicle based on the identifying information relating to the physical location. For example, the media guidance application may send a query to the remote server or to the airline to inquire about available times when the airplane corresponding to the flight number will be located at an airport with broadband access, e.g., in between flights. The media guidance application may then determine, from the travel schedule, a first time when the transportation vehicle is physically located at a first location with broadband network access and a second time when the transportation vehicle is physically located at the second location with broadband network access. For example, the media guidance application may obtain information, e.g., from the airline, that the airplane corresponding to flight "UA98" may be located at different airports at different times, prior to the departure time of the user's flight. The media guidance application may then determine that the first location corresponds to a closer network destination from the DVR 106 than the second location, and thus cause the transfer of the copy of the one or more media assets to the storage device associated with the physical location via the broadband network access when the transportation vehicle is physically located at the first location. For example, when the airplane 120 may be located in JFK airport 125, or in SFO airport in between flights, the media guidance application may determine that transferring the media assets to the airplane 120 to the network address corresponding to the JFK airport 125 is more efficient when the home DVR 106 is located in New York. The media guidance application may then transfer "ATP World Tour" to a network address corresponding to the storage device of the airplane 120 when connected to a gateway at the JFK airport 125, at the time when the airplane 120 is located within the JFK airport 125.

In some embodiments, the media guidance application may determine whether there is enough space at the physical location to transfer the encrypted copy of one or more media asset. For example, when the physical location corresponds to a private residence, e.g., the residence of "Jane Done" as indicated at 302 in FIG. 3, the local storage hardware may be a home DVR, which may or may not have sufficient storage space for the transfer. The media guidance application may send, to the remote server, the transfer request having an estimate of storage space for the one or more media assets. For example, when a user selects to transfer "ATP World Tour" at 202 in FIG. 2, the media guidance application may send an inquiry to the remote server including an estimated file size of the media file "ATP World Tour." The media guidance application may receive an indication that the storage device associated with the physical location has insufficient storage space. The media guidance application may then convert the copy of one or more media assets from a first video format to a second video format with a reduced file size. For example, the media guidance application may compress the media file of "ATP World Tour" with a reduced file size, or convert a high-definition version to a standard-definition version. The media guidance application may then cause the transfer of the converted copy of one or more media assets in the second video format to the storage device associated with the physical location.

The media guidance application may cause presentation, at the physical location, of the copy of the one or more media assets within the duration of time based on the user authentication requirement. For example, as shown at screens 208 and 210 as described above, a user, when boarding the flight, may be able to access the transferred "ATP World Tour" via the in-flight multimedia system, upon providing the security code at screen 208.

Figure 4:
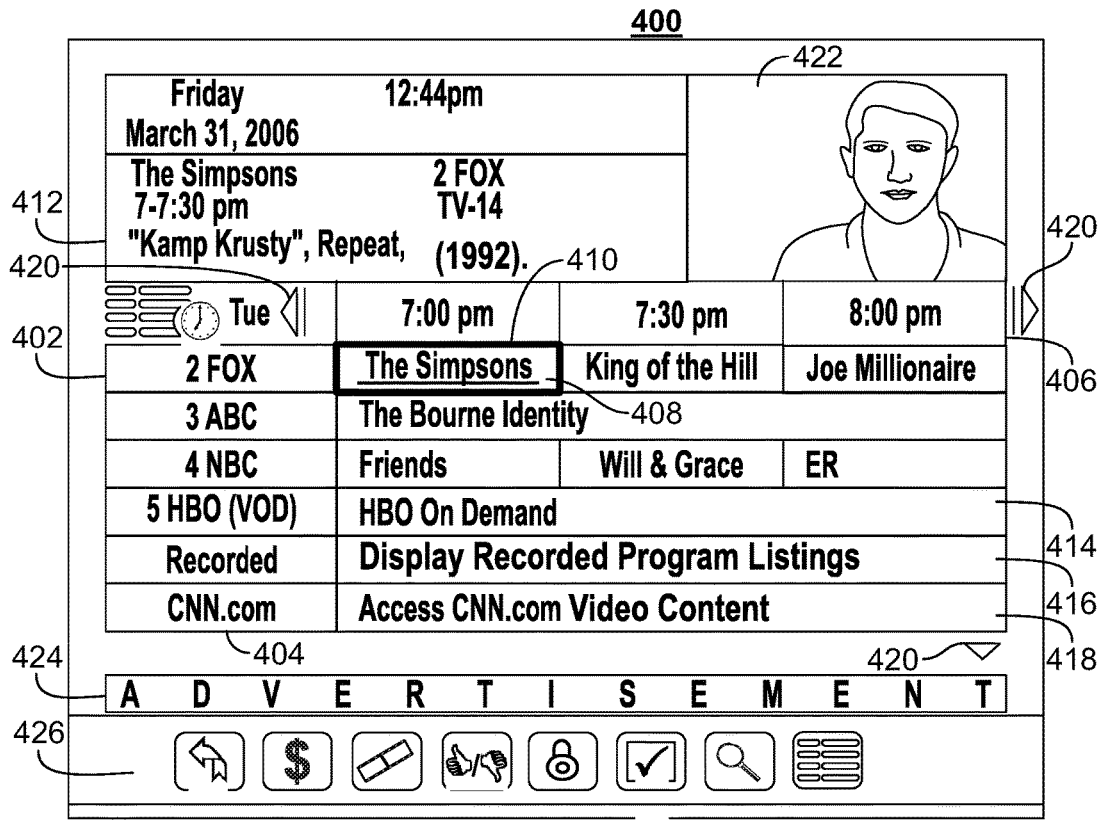
FIG. 4 shows an illustrative embodiment of a display screen that may be used to provide media guidance application listings and other media guidance information, in accordance with some embodiments of the disclosure.
Figure 5:
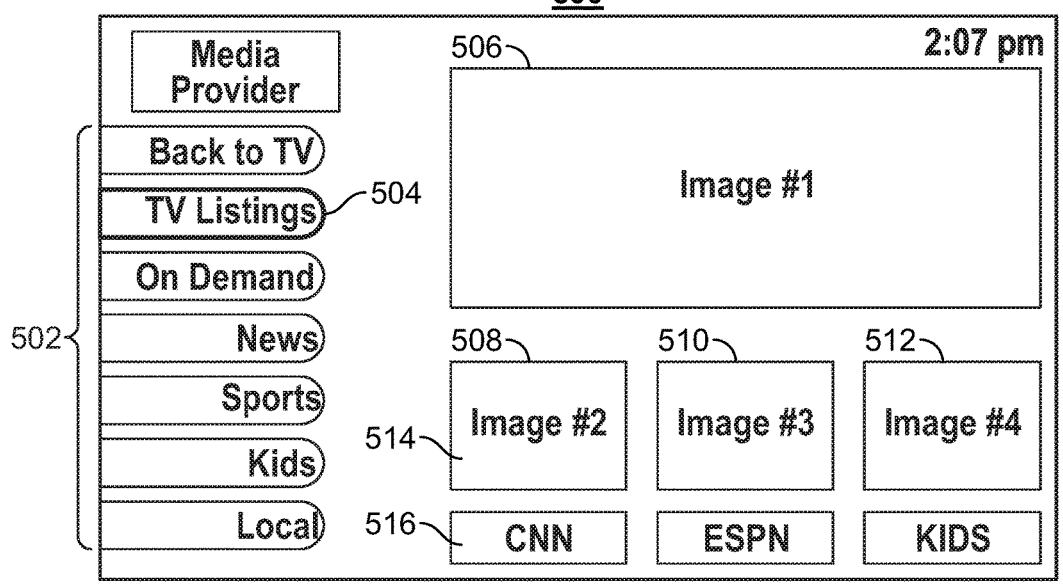
FIG. 5 shows another illustrative embodiment of a display screen that may be used to provide media guidance application listings, in accordance with some embodiments of the disclosure.

FIGS. 4-5 show illustrative display screens that may be used to provide media guidance data. The display screens shown in FIGS. 4-5 may be implemented on any suitable user equipment device or platform, e.g., user equipment 106 in FIG. 1. While the displays of FIGS. 4-5 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 4 shows illustrative grid of a program listings display 400 arranged by time and channel that also enables access to different types of content in a single display. Display 400 may include grid 402 with: (1) a column of channel/content type identifiers 404, where each channel/content type identifier (which is a cell in the column) identifies a different channel or content type available; and (2) a row of time identifiers 406, where each time identifier (which is a cell in the row) identifies a time block of programming. Grid 402 also includes cells of program listings, such as program listing 408, where each listing provides the title of the program provided on the listing's associated channel and time. With a user input device, a user can select program listings by moving highlight region 410. Information relating to the program listing selected by highlight region 410 may be provided in program information region 412. Region 412 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 402 may provide media guidance data for non-linear programming including on-demand listing 414, recorded content listing 416, and Internet content listing 418. A display combining media guidance data for content from different types of content sources is sometimes referred to as a "mixed-media" display. Various permutations of the types of media guidance data that may be displayed that are different than display 400 may be based on user selection or guidance application definition (e.g., a display of only recorded and broadcast listings, only on-demand and broadcast listings, etc.). As illustrated, listings 414, 416, and 418 are shown as spanning the entire time block displayed in grid 402 to indicate that selection of these listings may provide access to a display dedicated to on-demand listings, recorded listings, or Internet listings, respectively. In some embodiments, listings for these content types may be included directly in grid 402. Additional media guidance data may be displayed in response to the user selecting one of the navigational icons 420. (Pressing an arrow key on a user input device may affect the display in a similar manner as selecting navigational icons 420.)

Display 400 may also include video region 422, and options region 426. Video region 422 may allow the user to view and/or preview programs that are currently available, will be available, or were available to the user. The content of video region 422 may correspond to, or be independent from, one of the listings displayed in grid 402. Grid displays including a video region are sometimes referred to as picture-in-guide (PIG) displays. PIG displays and their functionalities are described in greater detail in Satterfield et al. U.S. Pat. No. 6,564,378, issued May 13, 4003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 426 may allow the user to access different types of content, media guidance application displays, and/or media guidance application features. Options region 426 may be part of display 400 (and other display screens described herein), or may be invoked by a user by selecting an on-screen option or pressing a dedicated or assignable button on a user input device. The selectable options within options region 426 may concern features related to program listings in grid 402 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 4D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 7. Additional personalized media guidance application features are described in greater detail in Ellis et al., U.S. Patent Application Publication No. 2005/0251827, filed Jul. 11, 3005, Boyer et al., U.S. Pat. No. 7,165,098, issued Jan. 16, 3007, and Ellis et al., U.S. Patent Application Publication No. 2002/0174430, filed Feb. 31, 3002, which are hereby incorporated by reference herein in their entireties.

Another display arrangement for providing media guidance is shown in FIG. 5. Video mosaic display 500 includes selectable options 502 for content information organized based on content type, genre, and/or other organization criteria. In display 500, television listings option 504 is selected, thus providing listings 506, 508, 510, and 512 as broadcast program listings. In display 500 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 508 may include more than one portion, including media portion 514 and text portion 516. Media portion 514 and/or text portion 516 may be selectable to view content in full-screen or to view information related to the content displayed in media portion 514 (e.g., to view listings for the channel that the video is displayed on).

The listings in display 500 are of different sizes (i.e., listing 506 is larger than listings 508, 510, and 512), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 6:
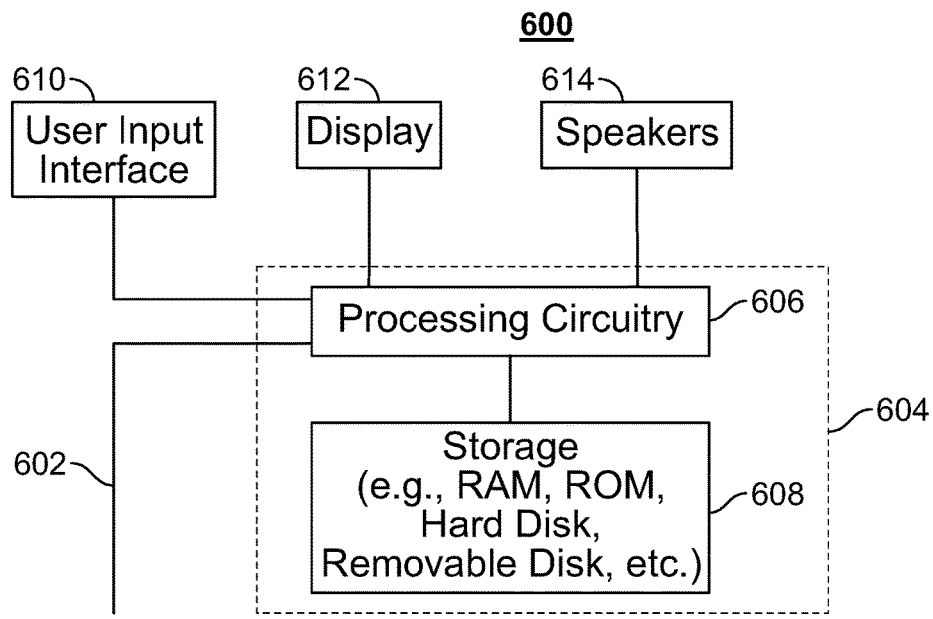
FIG. 6 is a block diagram of an illustrative user equipment (UE) device in accordance with some embodiments of the disclosure.

Users may access content and the media guidance application (and its display screens described above and below) from one or more of their user equipment devices. FIG. 6 shows a generalized embodiment of illustrative user equipment device 600. More specific implementations of user equipment devices are discussed below in connection with FIG. 7. User equipment device 500 may receive content and data via input/output (hereinafter "I/O") path 602. I/O path 602 may provide content (e.g., broadcast programming, on-demand programming, Internet content, content available over a local area network (LAN) or wide area network (WAN), and/or other content) and data to control circuitry 604, which includes processing circuitry 606 and storage 608. Control circuitry 604 may be used to send and receive commands, requests, and other suitable data using I/O path 602. I/O path 602 may connect control circuitry 604 (and specifically processing circuitry 506) to one or more communications paths (described below). I/O functions may be provided by one or more of these communications paths, but are shown as a single path in FIG. 6 to avoid overcomplicating the drawing.

Control circuitry 604 may be based on any suitable processing circuitry such as processing circuitry 606. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 604 executes instructions for a media guidance application stored in memory (i.e., storage 608). Specifically, control circuitry 604 may be instructed by the media guidance application to perform the functions discussed above and below. For example, the media guidance application may provide instructions to control circuitry 604 to generate the media guidance displays. In some implementations, any action performed by control circuitry 604 may be based on instructions received from the media guidance application.

In client-server based embodiments, control circuitry 604 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 6). In addition, communications circuitry may include circuitry that enables peer-to-peer communication of user equipment devices, or communication of user equipment devices in locations remote from each other (described in more detail below).

Memory may be an electronic storage device provided as storage 608 that is part of control circuitry 604. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 608 may be used to store various types of content described herein as well as media guidance data described above. Nonvolatile memory may also be used (e.g., to launch a boot-up routine and other instructions). Cloud-based storage, described in relation to FIG. 7, may be used to supplement storage 708 or instead of storage 608.

Control circuitry 604 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 604 may also include scaler circuitry for upconverting and downconverting content into the preferred output format of the user equipment 500. Circuitry 504 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 608 is provided as a separate device from user equipment 500, the tuning and encoding circuitry (including multiple tuners) may be associated with storage 508.

A user may send instructions to control circuitry 604 using user input interface 610. User input interface 610 may be any suitable user interface, such as a remote control, mouse, trackball, keypad, keyboard, touch screen, touchpad, stylus input, joystick, voice recognition interface, or other user input interfaces. Display 612 may be provided as a stand-alone device or integrated with other elements of user equipment device 600. For example, display 612 may be a touchscreen or touch-sensitive display. In such circumstances, user input interface 610 may be integrated with or combined with display 612. Display 612 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 612 may be HDTV-capable. In some embodiments, display 612 may be a 3D display, and the interactive media guidance application and any suitable content may be displayed in 3D. A video card or graphics card may generate the output to the display 612. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 604. The video card may be integrated with the control circuitry 604. Speakers 614 may be provided as integrated with other elements of user equipment device 600 or may be stand-alone units. The audio component of videos and other content displayed on display 612 may be played through speakers 614. In some embodiments, the audio may be distributed to a receiver (not shown), which processes and outputs the audio via speakers 614.

The guidance application may be implemented using any suitable architecture. For example, it may be a stand-alone application wholly-implemented on user equipment device 600. In such an approach, instructions of the application are stored locally (e.g., in storage 608), and data for use by the application is downloaded on a periodic basis (e.g., from an out-of-band feed, from an Internet resource, or using another suitable approach). Control circuitry 604 may retrieve instructions of the application from storage 608 and process the instructions to generate any of the displays discussed herein. Based on the processed instructions, control circuitry 604 may determine what action to perform when input is received from input interface 610. For example, movement of a cursor on a display up/down may be indicated by the processed instructions when input interface 610 indicates that an up/down button was selected.

In some embodiments, the media guidance application is a client-server based application. Data for use by a thick or thin client implemented on user equipment device 600 is retrieved on-demand by issuing requests to a server remote to the user equipment device 600. In one example of a client-server based guidance application, control circuitry 604 runs a web browser that interprets web pages provided by a remote server. For example, the remote server may store the instructions for the application in a storage device. The remote server may process the stored instructions using circuitry (e.g., control circuitry 604) and generate the displays discussed above and below. The client device may receive the displays generated by the remote server and may display the content of the displays locally on equipment device 600. This way, the processing of the instructions is performed remotely by the server while the resulting displays are provided locally on equipment device 600. Equipment device 600 may receive inputs from the user via input interface 610 and transmit those inputs to the remote server for processing and generating the corresponding displays. For example, equipment device 600 may transmit a communication to the remote server indicating that an up/down button was selected via input interface 610. The remote server may process instructions in accordance with that input and generate a display of the application corresponding to the input (e.g., a display that moves a cursor up/down). The generated display is then transmitted to equipment device 600 for presentation to the user.

In some embodiments, the media guidance application is downloaded and interpreted or otherwise run by an interpreter or virtual machine (run by control circuitry 604). In some embodiments, the guidance application may be encoded in the ETV Binary Interchange Format (EBIF), received by control circuitry 604 as part of a suitable feed, and interpreted by a user agent running on control circuitry 604. For example, the guidance application may be an EBIF application. In some embodiments, the guidance application may be defined by a series of JAVA-based files that are received and run by a local virtual machine or other suitable middleware executed by control circuitry 604. In some of such embodiments (e.g., those employing MPEG-2 or other digital media encoding schemes), the guidance application may be, for example, encoded and transmitted in an MPEG-2 object carousel with the MPEG audio and video packets of a program.

Figure 7:
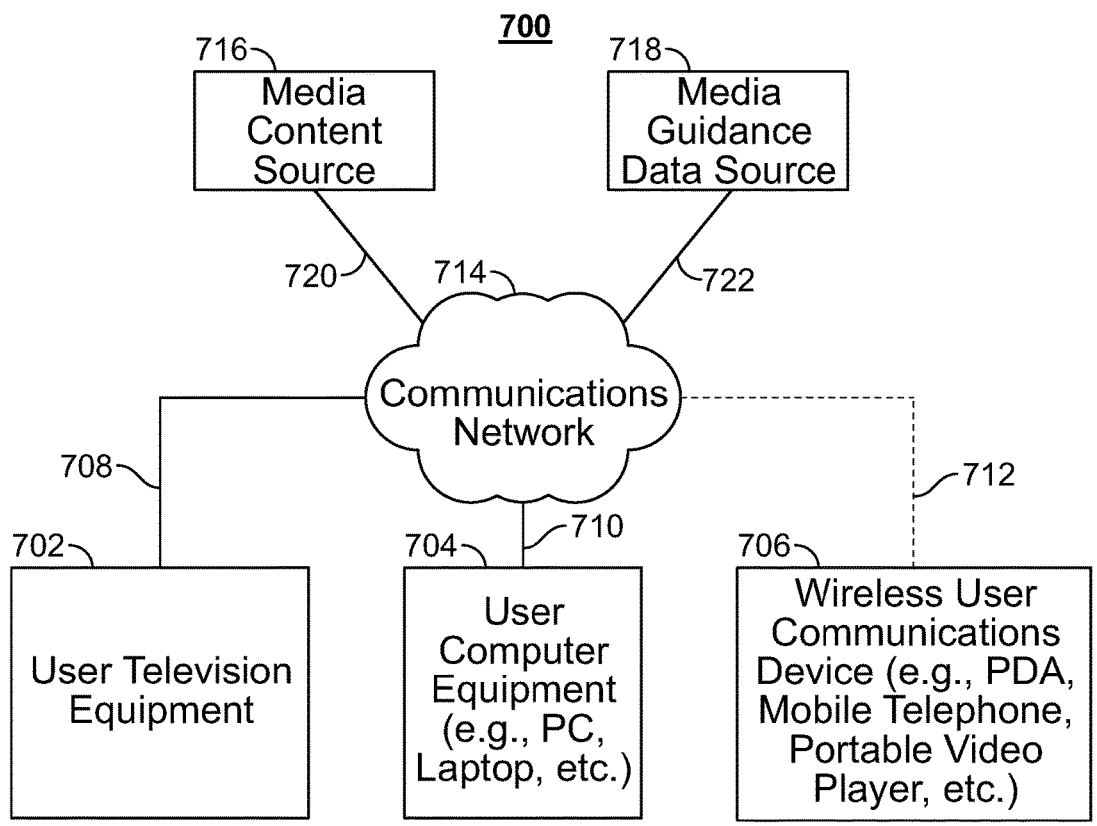
FIG. 7 is a block diagram of an illustrative media system in accordance with some embodiments of the disclosure.

User equipment device 700 of FIG. 7 can be implemented in system 700 of FIG. 7 as user television equipment 702, user computer equipment 704, wireless user communications device 706, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 5 may not be classified solely as user television equipment 702, user computer equipment 704, or a wireless user communications device 706. For example, user television equipment 702 may, like some user computer equipment 704, be Internet-enabled allowing for access to Internet content, while user computer equipment 704 may, like some television equipment 702, include a tuner allowing for access to television programming. The media guidance application may have the same layout on various different types of user equipment or may be tailored to the display capabilities of the user equipment. For example, on user computer equipment 704, the guidance application may be provided as a web site accessed by a web browser. In another example, the guidance application may be scaled down for wireless user communications devices 706.

In system 700, there is typically more than one of each type of user equipment device but only one of each is shown in FIG. 7 to avoid overcomplicating the drawing. In addition, each user may utilize more than one type of user equipment device and also more than one of each type of user equipment device.

In some embodiments, a user equipment device (e.g., user television equipment 702, user computer equipment 704, wireless user communications device 706) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 714. Namely, user television equipment 702, user computer equipment 704, and wireless user communications device 706 are coupled to communications network 714 via communications paths 708, 710, and 712, respectively. Communications network 714 may be one or more networks including the Internet, a mobile phone network, mobile voice or data network (e.g., a 4G or LTE network), cable network, public switched telephone network, or other types of communications network or combinations of communications networks. Paths 708, 710, and 712 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 712 is drawn with dotted lines to indicate that in the exemplary embodiment shown in FIG. 7 it is a wireless path and paths 708 and 710 are drawn as solid lines to indicate they are wired paths (although these paths may be wireless paths, if desired). Communications with the user equipment devices may be provided by one or more of these communications paths, but are shown as a single path in FIG. 7 to avoid overcomplicating the drawing.

Although communications paths are not drawn between user equipment devices, these devices may communicate directly with each other via communication paths, such as those described above in connection with paths 708, 710, and 712, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 714.

System 700 includes content source 716 and media guidance data source 718 coupled to communications network 714 via communication paths 720 and 722, respectively. Paths 720 and 722 may include any of the communication paths described above in connection with paths 708, 710, and 712. Communications with the content source 716 and media guidance data source 718 may be exchanged over one or more communications paths, but are shown as a single path in FIG. 7 to avoid overcomplicating the drawing. In addition, there may be more than one of each of content source 716 and media guidance data source 718, but only one of each is shown in FIG. 7 to avoid overcomplicating the drawing. (The different types of each of these sources are discussed below.) If desired, content source 716 and media guidance data source 718 may be integrated as one source device. Although communications between sources 716 and 718 with user equipment devices 702, 704, and 706 are shown as through communications network 714, in some embodiments, sources 716 and 718 may communicate directly with user equipment devices 702, 704, and 706 via communication paths (not shown) such as those described above in connection with paths 708, 710, and 712.

Content source 716 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 716 may be the originator of content (e.g., a television broadcaster, a Webcast provider, etc.) or may not be the originator of content (e.g., an on-demand content provider, an Internet provider of content of broadcast programs for downloading, etc.). Content source 716 may include cable sources, satellite providers, on-demand providers, Internet providers, over-the-top content providers, or other providers of content. Content source 716 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 718 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 718 may be provided to users'' equipment using a client-server approach. For example, a user equipment device may pull media guidance data from a server, or a server may push media guidance data to a user equipment device. In some embodiments, a guidance application client residing on the user's equipment may initiate sessions with source 718 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 718 may provide user equipment devices 702, 704, and 706 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 508, and executed by control circuitry 704 of a user equipment device 500. In some embodiments, media guidance applications may be client-server applications where only a client application resides on the user equipment device, and server application resides on a remote server. For example, media guidance applications may be implemented partially as a client application on control circuitry 704 of user equipment device 500 and partially on a remote server as a server application (e.g., media guidance data source 718) running on control circuitry of the remote server. When executed by control circuitry of the remote server (such as media guidance data source 718), the media guidance application may instruct the control circuitry to generate the guidance application displays and transmit the generated displays to the user equipment devices. The server application may instruct the control circuitry of the media guidance data source 718 to transmit data for storage on the user equipment. The client application may instruct control circuitry of the receiving user equipment to generate the guidance application displays.

Content and/or media guidance data delivered to user equipment devices 702, 704, and 706 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 700 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 7.

In one approach, user equipment devices may communicate with each other within a home network. User equipment devices can communicate with each other directly via short-range point-to-point communication schemes described above, via indirect paths through a hub or other similar device provided on a home network, or via communications network 714. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 716 to access content. Specifically, within a home, users of user television equipment 702 and user computer equipment 704 may access the media guidance application to navigate among and locate desirable content. Users may also access the media guidance application outside of the home using wireless user communications devices 706 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 714. These cloud resources may include one or more content sources 716 and one or more media guidance data sources 718. In addition or in the alternative, the remote computing sites may include other user equipment devices, such as user television equipment 702, user computer equipment 704, and wireless user communications device 706. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 704 or wireless user communications device 706 having content capture feature. Alternatively, the user can first transfer the content to a user equipment device, such as user computer equipment 704. The user equipment device storing the content uploads the content to the cloud using a data transmission service on communications network 714. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 7.

Figure 8:
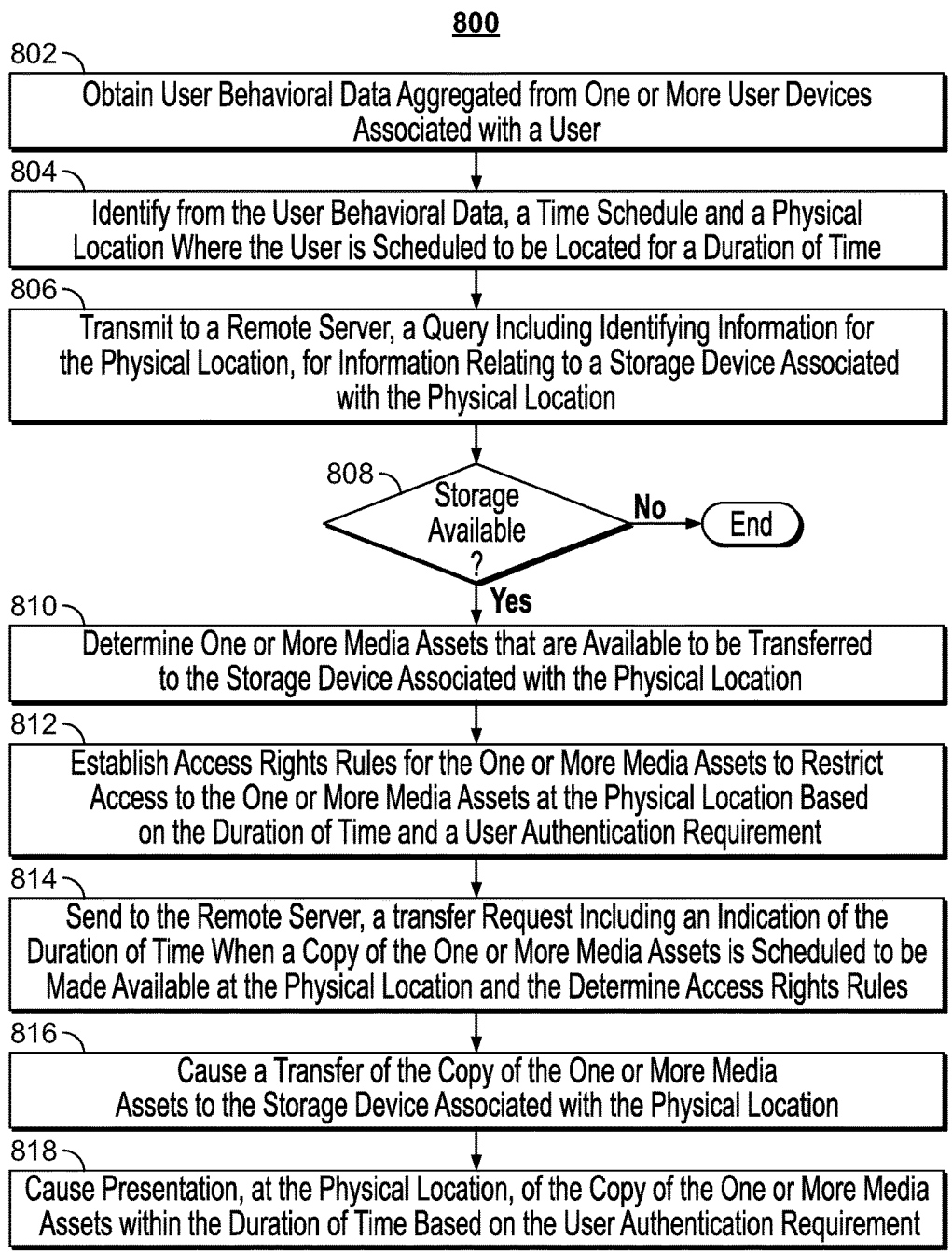
FIG. 8 depicts an illustrative flowchart of a process for extending storage hardware of a DVR, in accordance with some embodiments of the disclosure.

FIG. 8 depicts an illustrative flowchart of a process for extending storage hardware of a DVR, in accordance with some embodiments of the disclosure. Process 800 may be executed by control circuitry 604 (e.g., in a manner instructed to control circuitry 604 by the media guidance application). Control circuitry 604 may be part of user equipment (e.g., user equipment 106, user television equipment 702, user computer equipment 704, and/or wireless communications device 706), or of a remote server separated from the user equipment by way of communications network 714.

Process 800 begins at 802, where control circuitry 604 obtains user behavioral data aggregated from one or more user devices associated with a user. For example, control circuitry 604 monitors and aggregates electronic communications associated with a user device relating to a travel schedule of the user. At 804, control circuitry 604 identifies, from the user behavioral data, a time schedule and a physical location where the user is scheduled to be located for a duration of time. For example, control circuitry 604 retrieves, e.g., from storage 608 in FIG. 6 or data source 718 in FIG. 7, a calendar event including flight information (e.g., see flight information 114 in FIG. 1), and parses the flight information to obtain a date of "Jan-09," a physical location of "UA98," and a duration from "19:40 PM" Eastern Time to "22:42 PM" Pacific Time. At 806, control circuitry 604 transmits, to a remote server via communications network 714 in FIG. 7, a query including identifying information for the physical location, for information relating to a storage device associated with the physical location. For example, control circuitry 604 forms a query based on the flight number "UA98" and the flight date of "Jan-09" and sends the query to a server corresponding to the airline.

Figure 10:
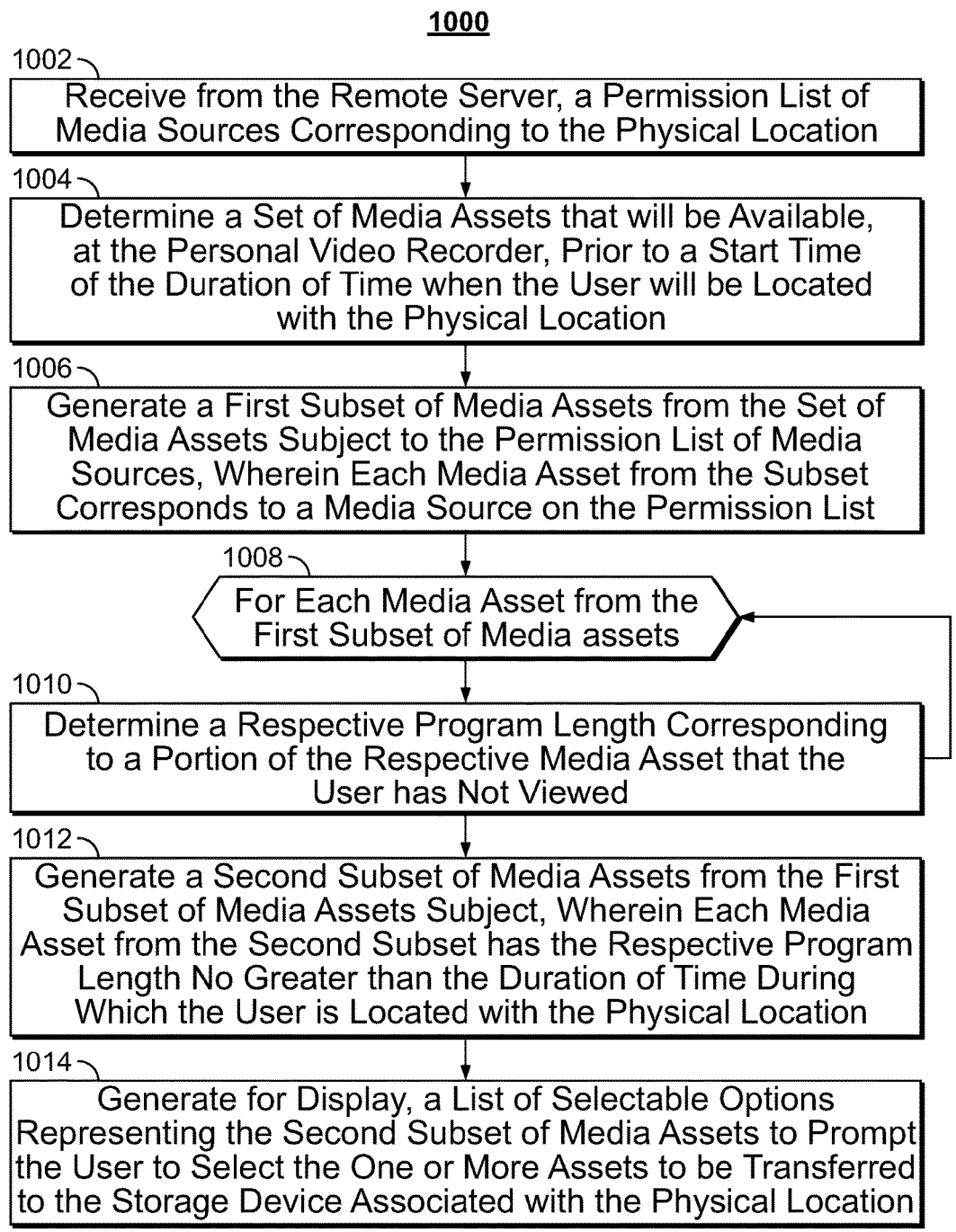
FIG. 10 depicts an illustrative flowchart of a process for determining one or more media assets to transfer to the physical location, in accordance with some embodiments of the disclosure.

At 808, in response to obtaining information that storage space is available at the physical location, process 800 proceeds to 810, where control circuitry 604 determines one or more media assets that are available to be transferred to the storage device associated with the physical location, as further described in FIG. 10. At 808, in response to obtaining information that storage space is unavailable at the physical location, process 800 ends. At 812, control circuitry 604 establishes access rights rules for the one or more media assets to restrict access to the one or more media assets at the physical location based on the duration of time and a user authentication requirement, as further described in FIG. 13. At 814, control circuitry 604 sends, via communications network 714 in FIG. 7, to the remote server, a transfer request including an indication of the duration of time when a copy of the one or more media assets is scheduled to be made available at the physical location and the determined access rights rules. For example, control circuitry 604 generates an example UI as described at 202 in FIG. 2 or 308 in FIG. 3 for a user to initiate the transfer. At 816, control circuitry 604 causes a transfer of the copy of the one or more media assets to the storage device associated with the physical location, as further described in FIG. 12. At 818, control circuitry 604 causes presentation, at the physical location, of the copy of the one or more media assets within the duration of time based on the user authentication requirement, e.g., as shown at example UIs 208 and 210 in FIG. 2.

Figure 9:
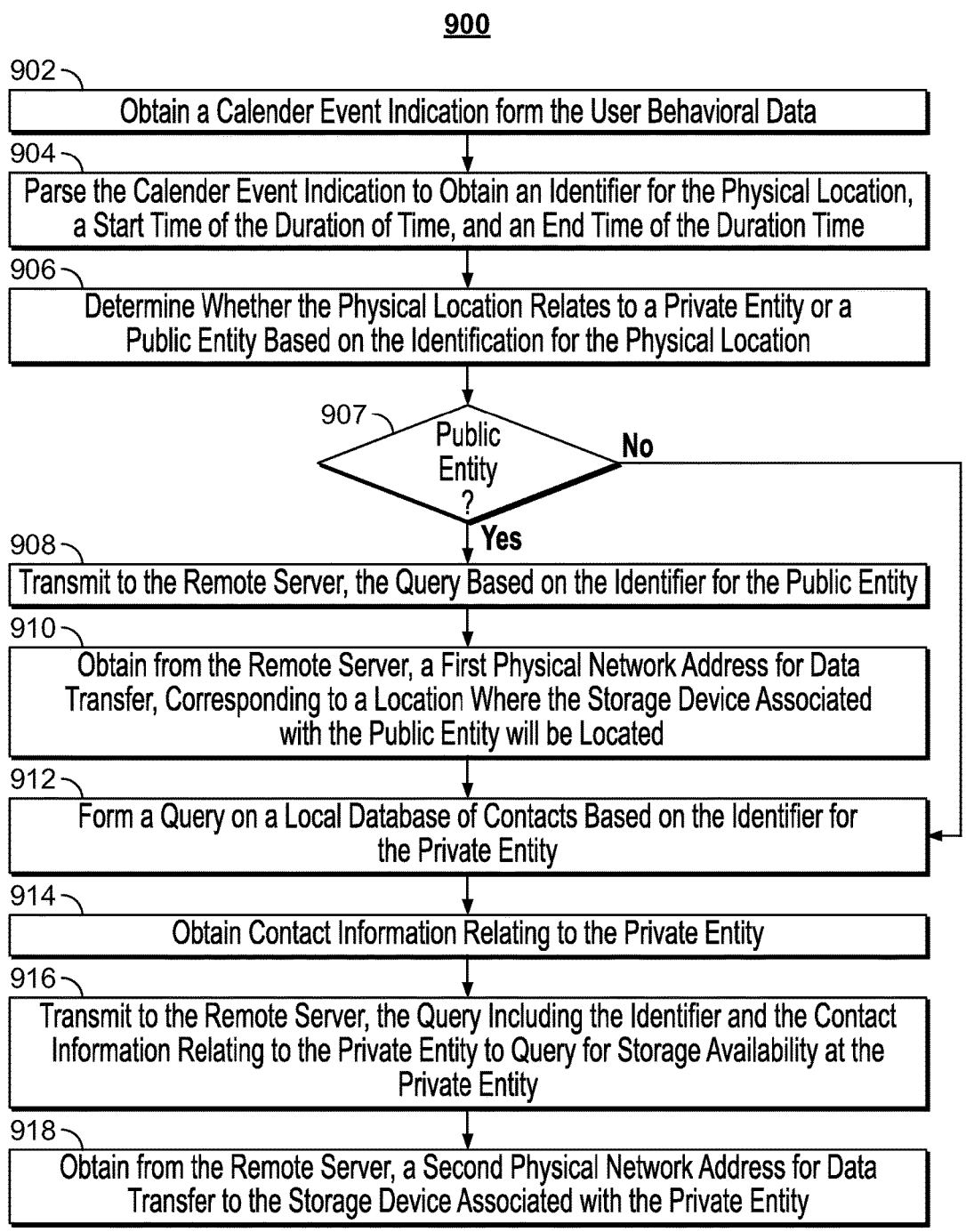
FIG. 9 depicts an illustrative flowchart of a process for identifying a network destination for transferring one or more media assets to a physical location, in accordance with some embodiments of the disclosure.

FIG. 9 depicts an illustrative flowchart of a process for identifying a network destination for transferring one or more media assets to a physical location, in accordance with some embodiments of the disclosure. Process 900 may be executed by control circuitry 604 (e.g., in a manner instructed to control circuitry 604 by the media guidance application). Control circuitry 604 may be part of user equipment (e.g., user equipment 106, user television equipment 702, user computer equipment 704, and/or wireless communications device 706), or of a remote server separated from the user equipment by way of communications network 714.

Process 900 begins at 902, where control circuitry 604 obtains a calendar event indication from the user behavioral data, e.g., see flight information 114 in FIG. 1. At 904, control circuitry 604 parses the calendar event indication to obtain an identifier for the physical location, a start time of the duration of time, and an end time of the duration time. At 906, control circuitry 604 determines whether the physical location relates to a private entity or a public entity based on the identifier for the physical location. For example, control circuitry 604 determines, based on an identifier of "UA98" which is a flight number, that the physical location where the user is going to be located is a public transportation vehicle, as described in FIG. 1.

At 907, when the physical location is a public entity (e.g., a flight, etc.), process 900 proceeds to 908, where control circuitry 604 transmits, via communications network 714 in FIG. 7, to the remote server, the query based on the identifier for the public entity. At 908, control circuitry 604 obtains, via the communications network 714, from the remote server, a first physical network address for data transfer, corresponding to a location where the storage device associated with the public entity will be located. For example, control circuitry 604 obtains an IP address corresponding to the storage device on the airplane of flight "UA98."

At 907, when the physical location is not a public entity but a private entity (e.g., a private contact, etc.), process 900 proceeds to 912, where control circuitry 604 forms a query on a local database of contacts based on the identifier for the private entity. For example, as shown at 302 in FIG. 3, control circuitry 604 determines that the user is going to be located at the residence of "Jane Doe" (grandmother), and then searches for the contact "Jane Doe" in the user's contact list. At 914, control circuitry 604 obtains contact information relating to the private entity, such as but not limited to including, but not limited to a telephone number, a user name, a residential address, an electronic mail address, an instant messenger screen name, and a social media profile name, and/or the like. At 916, control circuitry 604 transmits, via communications network 714, to the remote server, the query including the identifier and the contact information relating to the private entity to query for storage availability at the private entity. At 918, control circuitry 604 obtains, via communications network 714, from the remote server, a second physical network address for data transfer to the storage device associated with the private entity. For example, control circuitry 604 obtains an IP address, a MAC address, and/or the like of the DVR associated with the private entity "Jane Doe," which can be used to receive data transfer on a data network.

FIG. 10 depicts an illustrative flowchart of a process for determining one or more media assets to transfer to the physical location (e.g., 810 in FIG. 8), in accordance with some embodiments of the disclosure. Process 1000 may be executed by control circuitry 604 (e.g., in a manner instructed to control circuitry 604 by the media guidance application). Control circuitry 604 may be part of user equipment (e.g., user equipment 106, user television equipment 702, user computer equipment 704, and/or wireless communications device 706), or of a remote server separated from the user equipment by way of communications network 714.

Process 1000 begins at 1002, where control circuitry 604 receives, via communications network 714 in FIG. 7, from the remote server, a permission list of media sources corresponding to the physical location. For example, the permission list takes a form of a data table that includes a list of media sources, and media assets recorded from the list of media sources are eligible to be transferred to the physical location. At 1004, control circuitry 604 determines a set of media assets that will be available, at the DVR, prior to a start time of the duration of time when the user will be located with the physical location, and generate a first subset of media assets from the set of media assets subject to the permission list of media sources at 1006. Each media asset from the subset corresponds to a media source on the permission list.

At 1008, for each media asset from the first subset of media assets, control circuitry 604 determines a respective program length corresponding to a portion of the respective media asset that the user has not viewed at 1010. Process 1000 repeats at 1008 and 1010 until every media asset from the first subset has been visited. For example, control circuitry 604 retrieves a playback position from the metadata of the media asset, indicating the progression point where the user left off the media asset. Thus, control circuitry 604 computes a remaining length that the user has not watched for the media asset. At 1012, control circuitry 604 generates a second subset of media assets from the first subset of media assets subject Each media asset from the second subset has the respective program length no greater than the duration of time during which the user is located with the physical location. At 1012, control circuitry 604 generates for display, a list of selectable options representing the second subset of media assets to prompt the user to select the one or more media assets to be transferred to the storage device associated with the physical location, e.g., as described in example UI 202 in FIGS. 2 and 308 in FIG. 3.

Figure 11:
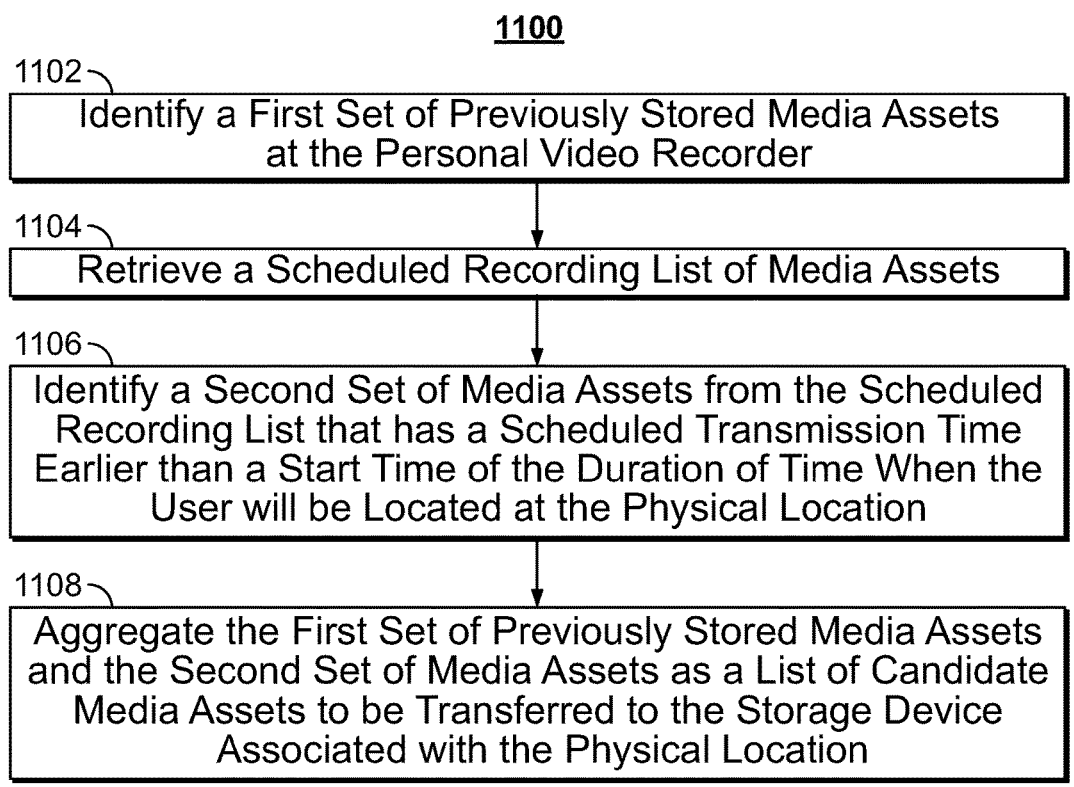
FIG. 11 depicts an illustrative flowchart of a process for determining one or more media assets to transfer to the physical location based on the travel schedule, in accordance with some embodiments of the disclosure.

FIG. 11 depicts an illustrative flowchart of a process for determining one or more media assets to transfer to the physical location based on the travel schedule, in accordance with some embodiments of the disclosure. Process 1100 may be executed by control circuitry 604 (e.g., in a manner instructed to control circuitry 604 by the media guidance application). Control circuitry 604 may be part of user equipment (e.g., user equipment 106, user television equipment 702, user computer equipment 704, and/or wireless communications device 706), or of a remote server separated from the user equipment by way of communications network 714.

Process 1100 begins at 1102, where control circuitry 604 identifies a first set of previously stored media assets at the DVR. For example, control circuitry 604 retrieves media assets that are already recorded at the DVR at the time when control circuitry 604 identifies the travel schedule of the user. At 1104, control circuitry 604 retrieves a scheduled recording list of media assets. At 1106, control circuitry 604 identifies a second set of media assets from the scheduled recording list that has a scheduled transmission time earlier than a start time of the duration of time when the user will be located at the physical location. For example, control circuitry 604 saves a flag with scheduled recordings that will be recorded prior to the departure time indicated by the flight information 114 in FIG. 1. At 1108, control circuitry 604 aggregates the first set of previously stored media assets and the second set of media assets as a list of candidate media assets to be transferred to the storage device associated with the physical location. For example, control circuitry 604 schedules the transfer of candidate media assets that include previously stored media assets available at the DVR and media assets that are not yet available but will be recorded at the DVR before the user travels to the physical location.

Figure 12:
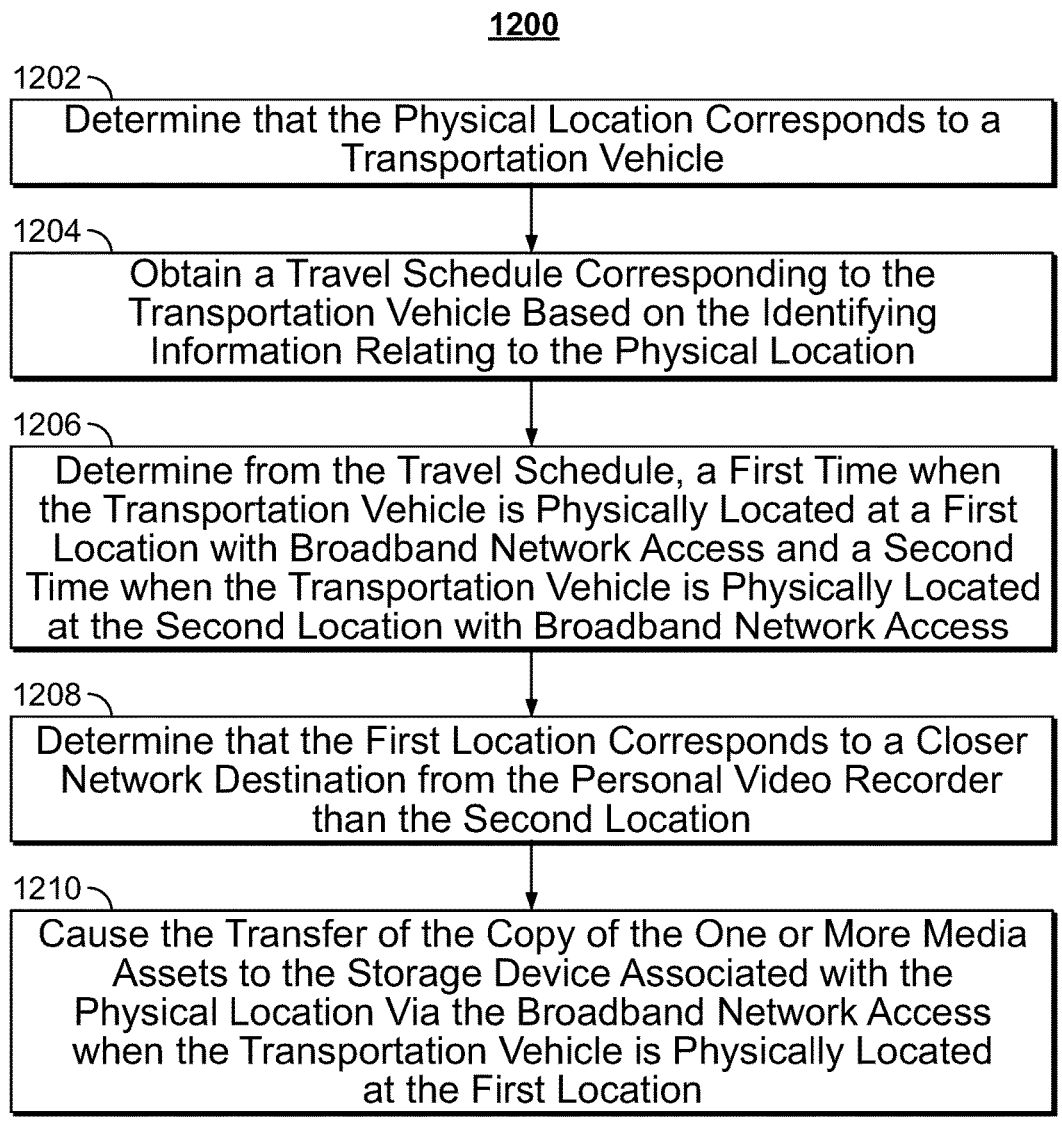
FIG. 12 depicts an illustrative flowchart of a process for determining when to transfer a media asset to the physical location, in accordance with some embodiments of the disclosure.

FIG. 12 depicts an illustrative flowchart of a process for determining when to transfer a media asset to the physical location, in accordance with some embodiments of the disclosure. Process 1200 may be executed by control circuitry 604 (e.g., in a manner instructed to control circuitry 604 by the media guidance application). Control circuitry 604 may be part of user equipment (e.g., user equipment 106, user television equipment 702, user computer equipment 704, and/or wireless communications device 706), or of a remote server separated from the user equipment by way of communications network 714.

Process 1200 begins at 1202, where control circuitry 604 determines that the physical location corresponds to a transportation vehicle, e.g., an airplane 120 of flight "UA98" in FIG. 1. At 1204, control circuitry 604 obtains a travel schedule corresponding to the transportation vehicle based on the identifying information relating to the physical location. For example, control circuitry 604 sends a query, via communications network 114, to the airline to inquire about available times when the airplane corresponding to the flight number will be located at an airport with broadband access, e.g., in between flights. At 1206, control circuitry 604 determines, from the travel schedule, a first time when the transportation vehicle is physically located at a first location with broadband network access and a second time when the transportation vehicle is physically located at the second location with broadband network access. For example, control circuitry 604 obtains information from the travel schedule that the airplane corresponding to flight number may be located at different airports at different times. At 1208, control circuitry 604 determines that the first location corresponds to a closer network destination from the personal video recorder than the second location. For example, control circuitry 604 retrieves, from storage 608 in FIG. 6, a data table including airport codes, and searches the data table for airport codes corresponding to the first location (e.g., "JFK") and the second location (e.g., "SFO"). Control circuitry 604 obtains a network address associated with each airport, and compares a current location of the DVR (e.g., 106 in FIG. 1) associated with the user with the network address for each airport. At 1210, control circuitry 604 causes the transfer of the copy of the one or more media assets to the storage device associated with the physical location via the broadband network access when the transportation vehicle is physically located at the first location. For example, control circuitry 604 generates a transfer command to instruct the DVR 106 to transfer one or more media assets to a network address corresponding to the storage device of the airplane when connected to a gateway at the JFK airport 125, at the time when the airplane 120 is located within the JFK airport 125, as described in FIG. 1.

Figure 13:
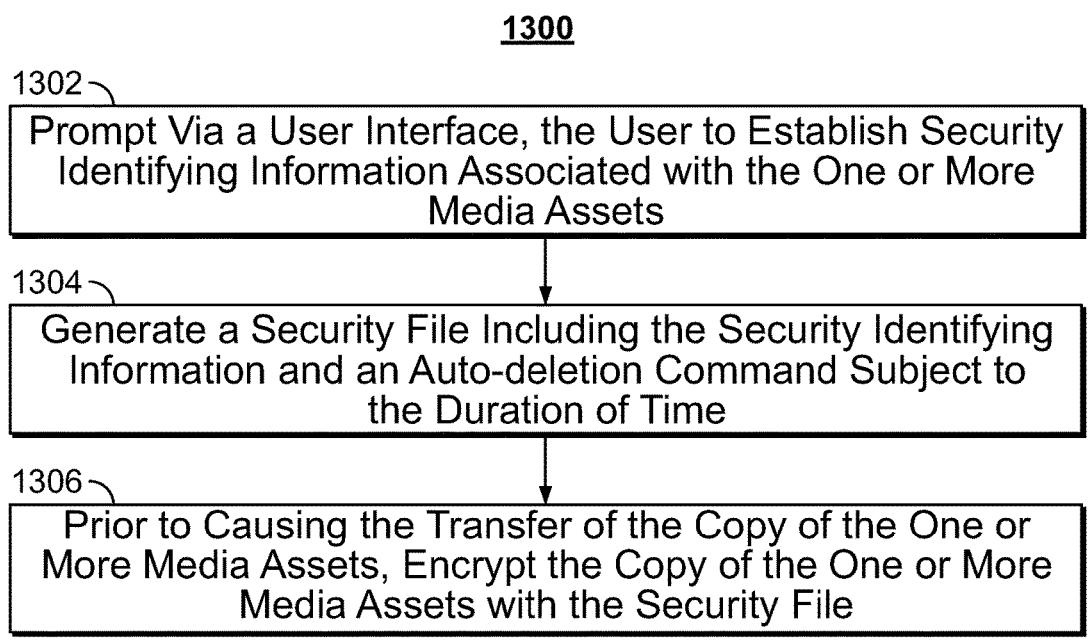
FIG. 13 depicts an illustrative flowchart of a process for establishing a user authentication procedure to access the transferred media assets, in accordance with some embodiments of the disclosure.

FIG. 13 depicts an illustrative flowchart of a process for establishing a user authentication procedure to access the transferred media assets, in accordance with some embodiments of the disclosure. Process 1300 may be executed by control circuitry 604 (e.g., in a manner instructed to control circuitry 604 by the media guidance application). Control circuitry 604 may be part of user equipment (e.g., user equipment 106, user television equipment 702, user computer equipment 704, and/or wireless communications device 706), or of a remote server separated from the user equipment by way of communications network 714.

Process 1300 begins at 1302, where control circuitry 604 prompts, via a user interface, the user to establish security identifying information associated with the one or more media assets, e.g., as described at the example UI 204 in FIG. 2. At 1304, control circuitry 604 generates a security file including the security identifying information and an auto-deletion command subject to the duration of time. For example, control circuitry 604 attaches an auto-deletion command that is configured with a timer and a time limit subject to the duration of the time. The auto-deletion command instructs the storage device at the physical location to erase the media asset from the storage device at the physical location once the timer reaches the time limit. At 1306, prior to causing the transfer of the copy of the one or more media assets, control circuitry 604 encrypts the copy of the one or more media assets with the security file. For example, the encrypted media assets, after being transferred to the physical location, are accessed by the user by unlocking the security file with a user input of the security information, e.g., as described in example UIs 208-210 in FIG. 2.

It should be noted that processes 800-1300 or any step thereof could be performed on, or provided by, any of the devices shown in, or described with respect to, FIGS. 1-3 and 6-7. For example, any of processes 800-1300 may be executed by control circuitry 704 (FIG. 7) as instructed by control circuitry implemented on user device 108, user equipment/DVR 106 (FIG. 1), 702, 704, 706 (FIG. 7), and/or the like for generating and displaying a summary view of a media asset. In addition, one or more steps of processes 800-1300 may be incorporated into or combined with one or more steps of any other process or embodiment.

It is contemplated that the actions or descriptions of each of FIGS. 8-13 may be used with any other embodiment of this disclosure. In addition, the actions and descriptions described in relation to FIGS. 8-13 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-13 could be used to perform one or more of the actions in FIGS. 8-13.

It will be apparent to those of ordinary skill in the art that methods involved in the present disclosure may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present disclosure may be executed using processing circuitry. For instance, determining a travel schedule of the user, e.g., by processing circuitry 606 of FIG. 6. The processing circuitry, for instance, may be a general purpose processor, a customized integrated circuit (e.g., an ASIC), or a field-programmable gate array (FPGA) within user equipment 600, media content source 716, or media guidance data source 718. For example, the attributes of media assets, may be stored in, and retrieved from, storage 608 of FIG. 6, or media guidance data source 718 of FIG. 7. Furthermore, processing circuitry, or a computer program, may update configuration data of the media guidance application, which may be stored within storage 608 of FIG. 6 or media guidance data source 718 of FIG. 7.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A method for extending storage space of a user device to a future location, the method comprising:
   obtaining user behavioral data aggregated from one or more user devices associated with a user;
   identifying, from the user behavioral data, a time schedule and a physical location where the user is scheduled to be located for a duration of time;
   transmitting, to a remote server, a query including identifying information for the physical location, for information relating to a storage device associated with the physical location;
   in response to determining that the storage device is available for transferring one or more media assets:
      determining one or more media assets that are available to be transferred to the storage device associated with the physical location;
      establishing access rights rules for the one or more media assets to restrict access to the one or more media assets at the physical location based on the duration of time and a user authentication requirement;
      sending, to the remote server, a transfer request including an indication of the duration of time when a copy of the one or more media assets is scheduled to be made available at the physical location and the determined access rights rules; and
      in response to the transfer request, causing a transfer of the copy of the one or more media assets to the storage device associated with the physical location; and
      causing presentation, at the physical location, of the copy of the one or more media assets within the duration of time based on the user authentication requirement.

2. The method of claim 1, wherein identifying, from the user behavioral data, a time schedule and a physical location where the user is scheduled to be located at for a duration of time comprises:
   obtaining a calendar event indication from the user behavioral data;
   parsing the calendar event indication to obtain an identifier for the physical location, a start time of the duration of time, and an end time of the duration time;
   determining whether the physical location relates to a private entity or a public entity based on the identifier for the physical location;
   in response to determining that the physical location relates to a public entity:
      transmitting, to the remote server, the query based on the identifier for the public entity; and
      obtaining, from the remote server, a first physical network address for data transfer, corresponding to a location where the storage device associated with the public entity will be located; and
   in response to determining that the physical location relates to a private entity:
      forming a query on a local database of contacts based on the identifier for the private entity;
      in response to the query, obtaining contact information relating to the private entity, the contact information being selected from a group consisting of a telephone number, a user name, a residential address, an electronic mail address, an instant messenger screen name, and a social media profile name;
      transmitting, to the remote server, the query including the identifier and the contact information relating to the private entity to query for storage availability at the private entity; and
      obtaining, from the remote server, a second physical network address for data transfer to the storage device associated with the private entity.

3. The method of claim 1, wherein determining one or more media assets that are available to be transferred to the storage device associated with the physical location comprises:
   identifying a first set of previously stored media assets at the personal video recorder;
   retrieving a scheduled recording list of media assets;
   identifying a second set of media assets from the scheduled recording list that has a scheduled transmission time earlier than a start time of the duration of time when the user will be located at the physical location; and
   aggregating the first set of previously stored media assets and the second set of media assets as a list of candidate media assets to be transferred to the storage device associated with the physical location.

4. The method of claim 1, wherein determining one or more media assets that are available to be transferred to the storage device associated with the physical location comprises:
   in response to transmitting, to the remote server, the query including identifying information for the physical location, receiving, from the remote server, a permission list of media sources corresponding to the physical location,
wherein the permission list specifies that media assets originally transmitted from the permission list of media sources are eligible to be transferred to the physical location;
determining a set of media assets that will be available, at the personal video recorder, prior to a start time of the duration of time when the user will be located with the physical location; and
generating a first subset of media assets from the set of media assets subject to the permission list of media sources, wherein each media asset from the subset corresponds to a media source on the permission list.

5. The method of claim 4, further comprising:
for each media asset from the first subset of media assets, determining a respective program length corresponding to a portion of the respective media asset that the user has not viewed;
generating a second subset of media assets from the first subset of media assets subject, wherein each media asset from the second subset has the respective program length no greater than the duration of time during which the user is located with the physical location; and
generating for display, a list of selectable options representing the second subset of media assets to prompt the user to select the one or more media assets to be transferred to the storage device associated with the physical location.

6. The method of claim 4, further comprising:
for each media asset from the first subset of media assets, determining a respective user interest indicator based on at least one of:
 a first viewing status indicating whether a user has started but not finished with the respective media asset,
 a second viewing status indicating whether a user has viewed at least another media asset that belong to a same series with the respective media asset,
 user preference data describing an attribute of media assets, or
 a recording status indicating whether the respective media asset was stored in response to a user manually configured recording event or an automatically generated recording series;
ranking the first subset of media assets based on the respective user interest indicator; and
generating for display, a recommendation of, or automatically selecting a media asset with a highest user interest indicator from the ranking as a candidate for transferring to the storage device associated with the physical location.

7. The method of claim 1, further comprising:
in response to determining the one or more media assets to be transferred to the storage device associated with the physical location, sending, to the remote server, indications of the one or more media assets;
receiving a response from the remote server indicating whether the one or more media assets will be available at the physical location at a time corresponding to the duration of time when the user is located at the physical location; and
refraining from causing the transfer of the copy of the one or more media assets to the storage device associated with the physical location when the one or more media assets will be available at the physical location.

8. The method of claim 1, wherein causing the transfer of the copy of the one or more media assets to the storage device associated with the physical location comprises:
in response to determining that the physical location corresponds to a transportation vehicle:
 obtaining a travel schedule corresponding to the transportation vehicle based on the identifying information relating to the physical location;
 determining, from the travel schedule, a first time when the transportation vehicle is physically located at a first location with broadband network access and a second time when the transportation vehicle is physically located at the second location with broadband network access;
 determining that the first location corresponds to a closer network destination from the personal video recorder than the second location; and
 causing the transfer of the copy of the one or more media assets to the storage device associated with the physical location via the broadband network access when the transportation vehicle is physically located at the first location.

9. The method of claim 1, further comprising:
sending, to the remote server, the transfer request having an estimate of storage space for the one or more media assets;
receiving an indication that the storage device associated with the physical location has insufficient storage space;
converting the copy of one or more media assets from a first video format to a second video format with a reduced file size; and
causing the transfer of the converted copy of one or more media assets in the second video format to the storage device associated with the physical location.

10. The method of claim 1, wherein establishing access rights rules for the one or more media assets to restrict access at the physical location to the duration of time and to a user authentication requirement comprises:
prompting, via a user interface, the user to establish security identifying information associated with the one or more media assets;
generating a security file including the security identifying information and an auto-deletion command subject to the duration of time; and
prior to causing the transfer of the copy of the one or more media assets, encrypting the copy of the one or more media assets with the security file,
 wherein the copy of the one or more media assets is to be accessed by unlocking the security file with an input of the security identifying information, and
 wherein the security file causes the storage device to delete the copy of the one or more media assets at the time when the duration of time has lapsed.

11. A system for extending storage space of a user device to a future location, the system comprising:
a memory; and
processing circuitry configured to:
 obtain user behavioral data aggregated from one or more user devices associated with a user;
 identify, from the user behavioral data, a time schedule and a physical location where the user is scheduled to be located for a duration of time;
 transmit, to a remote server, a query including identifying information for the physical location, for information relating to a storage device associated with the physical location;

in response to determining that the storage device is available for transferring one or more media assets:
  determine one or more media assets that are available to be transferred to the storage device associated with the physical location;
  establish access rights rules for the one or more media assets to restrict access to the one or more media assets at the physical location based on the duration of time and a user authentication requirement;
  send, to the remote server, a transfer request including an indication of the duration of time when a copy of the one or more media assets is scheduled to be made available at the physical location and the determined access rights rules; and
  in response to the transfer request, cause a transfer of the copy of the one or more media assets to the storage device associated with the physical location; and
  cause presentation, at the physical location, of the copy of the one or more media assets within the duration of time based on the user authentication requirement.

12. The system of claim 11, wherein the processing circuitry, when identifying, from the user behavioral data, a time schedule and a physical location where the user is scheduled to be located at for a duration of time, is further configured to:
  obtain a calendar event indication from the user behavioral data;
  parse the calendar event indication to obtain an identifier for the physical location, a start time of the duration of time, and an end time of the duration time;
  determine whether the physical location relates to a private entity or a public entity based on the identifier for the physical location;
  in response to determining that the physical location relates to a public entity:
    transmit, to the remote server, the query based on the identifier for the public entity; and
    obtain, from the remote server, a first physical network address for data transfer, corresponding to a location where the storage device associated with the public entity will be located; and
  in response to determining that the physical location relates to a private entity:
    form a query on a local database of contacts based on the identifier for the private entity;
    in response to the query, obtain contact information relating to the private entity, the contact information being selected from a group consisting of a telephone number, a user name, a residential address, an electronic mail address, an instant messenger screen name, and a social media profile name;
    transmit, to the remote server, the query including the identifier and the contact information relating to the private entity to query for storage availability at the private entity; and
    obtain, from the remote server, a second physical network address for data transfer to the storage device associated with the private entity.

13. The system of claim 11, wherein the processing circuitry, when determining one or more media assets that are available to be transferred to the storage device associated with the physical location, is further configured to:
  identify a first set of previously stored media assets at the personal video recorder;
  retrieve a scheduled recording list of media assets;
  identify a second set of media assets from the scheduled recording list that has a scheduled transmission time earlier than a start time of the duration of time when the user will be located at the physical location; and
  aggregate the first set of previously stored media assets and the second set of media assets as a list of candidate media assets to be transferred to the storage device associated with the physical location.

14. The system of claim 11, wherein the processing circuitry, when determining one or more media assets that are available to be transferred to the storage device associated with the physical location, is further configured to:
  in response to transmitting, to the remote server, the query including identifying information for the physical location, receive, from the remote server, a permission list of media sources corresponding to the physical location,
    wherein the permission list specifies that media assets originally transmitted from the permission list of media sources are eligible to be transferred to the physical location;
  determine a set of media assets that will be available, at the personal video recorder, prior to a start time of the duration of time when the user will be located with the physical location; and
  generate a first subset of media assets from the set of media assets subject to the permission list of media sources, wherein each media asset from the subset corresponds to a media source on the permission list.

15. The system of claim 14, wherein the processing circuitry is further configured to:
  for each media asset from the first subset of media assets, determine a respective program length corresponding to a portion of the respective media asset that the user has not viewed;
  generate a second subset of media assets from the first subset of media assets subject, wherein each media asset from the second subset has the respective program length no greater than the duration of time during which the user is located with the physical location; and
  generate for display, a list of selectable options representing the second subset of media assets to prompt the user to select the one or more media assets to be transferred to the storage device associated with the physical location.

16. The system of claim 14, wherein the processing circuitry is further configured to:
  for each media asset from the first subset of media assets, determine a respective user interest indicator based on at least one of:
    a first viewing status indicating whether a user has started but not finished with the respective media asset,
    a second viewing status indicating whether a user has viewed at least another media asset that belong to a same series with the respective media asset,
    user preference data describing an attribute of media assets, or
    a recording status indicating whether the respective media asset was stored in response to a user manually configured recording event or an automatically generated recording series;
  rank the first subset of media assets based on the respective user interest indicator; and
  generate for display, a recommendation of, or automatically selecting a media asset with a highest user interest indicator from the ranking as a candidate for transferring to the storage device associated with the physical location.

17. The system of claim 11, wherein the processing circuitry is further configured to:
in response to determining the one or more media assets to be transferred to the storage device associated with the physical location, send, to the remote server, indications of the one or more media assets;
receive a response from the remote server indicating whether the one or more media assets will be available at the physical location at a time corresponding to the duration of time when the user is located at the physical location; and
refrain from causing the transfer of the copy of the one or more media assets to the storage device associated with the physical location when the one or more media assets will be available at the physical location.

18. The system of claim 11, wherein the processing circuitry, when causing the transfer of the copy of the one or more media assets to the storage device associated with the physical location, is further configured to:
in response to determining that the physical location corresponds to a transportation vehicle:
obtain a travel schedule corresponding to the transportation vehicle based on the identifying information relating to the physical location;
determine, from the travel schedule, a first time when the transportation vehicle is physically located at a first location with broadband network access and a second time when the transportation vehicle is physically located at the second location with broadband network access;
determine that the first location corresponds to a closer network destination from the personal video recorder than the second location; and
cause the transfer of the copy of the one or more media assets to the storage device associated with the physical location via the broadband network access when the transportation vehicle is physically located at the first location.

19. The system of claim 11, wherein the processing circuitry is further configured to:
send, to the remote server, the transfer request having an estimate of storage space for the one or more media assets;
receive an indication that the storage device associated with the physical location has insufficient storage space;
convert the copy of one or more media assets from a first video format to a second video format with a reduced file size; and
cause the transfer of the converted copy of one or more media assets in the second video format to the storage device associated with the physical location.

20. The system of claim 11, wherein the processing circuitry, when establishing access rights rules for the one or more media assets to restrict access at the physical location to the duration of time and to a user authentication requirement, is further configured to:
prompt, via a user interface, the user to establish security identifying information associated with the one or more media assets;
generate a security file including the security identifying information and an auto-deletion command subject to the duration of time; and
prior to causing the transfer of the copy of the one or more media assets, encrypt the copy of the one or more media assets with the security file,
wherein the copy of the one or more media assets is to be accessed by unlocking the security file with an input of the security identifying information, and
wherein the security file causes the storage device to delete the copy of the one or more media assets at the time when the duration of time has lapsed.

* * * * *